US011422069B2

(12) United States Patent
Tamei et al.

(10) Patent No.: US 11,422,069 B2
(45) Date of Patent: Aug. 23, 2022

(54) SENSOR DEVICE

(71) Applicant: DENSO CORPORATION, Kariya (JP)

(72) Inventors: Yuto Tamei, Kariya (JP); Takashi Araki, Kariya (JP); Hirofumi Noda, Kariya (JP); Takehito Kimata, Kariya (JP); Koichi Yoshida, Kariya (JP)

(73) Assignee: DENSO CORPORATION, Kariya (JP)

( * ) Notice: Subject to any disclaimer, the term of this patent is extended or adjusted under 35 U.S.C. 154(b) by 118 days.

(21) Appl. No.: 16/885,648

(22) Filed: May 28, 2020

(65) Prior Publication Data
US 2020/0292422 A1 Sep. 17, 2020

Related U.S. Application Data

(63) Continuation of application No. PCT/JP2018/043091, filed on Nov. 22, 2018.

(30) Foreign Application Priority Data

Nov. 29, 2017 (JP) .............................. JP2017-229646
Sep. 26, 2018 (JP) .............................. JP2018-180508

(51) Int. Cl.
*G01N 15/06* (2006.01)
*G01N 1/22* (2006.01)
*G01N 27/04* (2006.01)
*G01N 27/407* (2006.01)
*G01D 11/24* (2006.01)

(52) U.S. Cl.
CPC .......... *G01N 1/2252* (2013.01); *G01D 11/245* (2013.01); *G01N 15/06* (2013.01); *G01N 27/04* (2013.01); *G01N 27/4077* (2013.01)

(58) Field of Classification Search
CPC ...... G01N 1/2252; G01N 15/06; G01N 27/04; G01N 27/4077; G01D 11/245
See application file for complete search history.

(56) References Cited

U.S. PATENT DOCUMENTS

| 6,327,891 | B1 | 12/2001 | Noda et al. |
| 6,348,141 | B1 | 2/2002 | Kato et al. |
| 2004/0144645 | A1* | 7/2004 | Yamada ............. G01N 27/4077 204/424 |
| 2015/0192509 | A1 | 7/2015 | Brueck et al. |
| 2017/0131185 | A1* | 5/2017 | Koike ................. G01N 15/0656 |
| 2018/0321125 | A1* | 11/2018 | Holzknecht .......... G01D 11/245 |

* cited by examiner

*Primary Examiner* — Jamel E Williams
(74) *Attorney, Agent, or Firm* — Nixon & Vanderhye P.C.

(57) ABSTRACT

A sensor device includes an element cover at the tip end of a housing, retaining a sensor element. An outer cover is provided with outer side holes, with the tip position of the outer side holes being farther toward the tip end than is the tip position of an inner cover, and a first flow passage having a gas flow direction that is at right angles to the axial direction is formed at the inner side of the outer cover. An inner side hole in the inner cover is open to a second flow passage provided between the side surfaces of the inner cover and the outer cover, and a detection surface of the sensor element is located on an extension line in an extension direction of a guide member which extends obliquely into the interior of the inner cover from the tip-position edge of the inner side hole.

11 Claims, 28 Drawing Sheets

SUPER-LOW VELOCITY REGION ≤ 3 m/s (MOUNTING DIRECTION 0°)

FIG.37
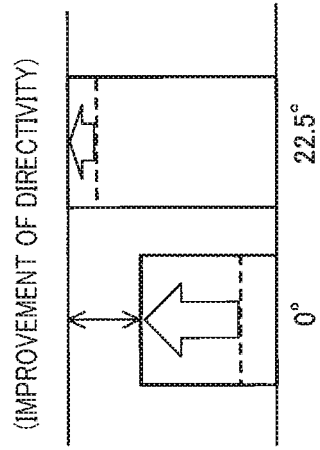
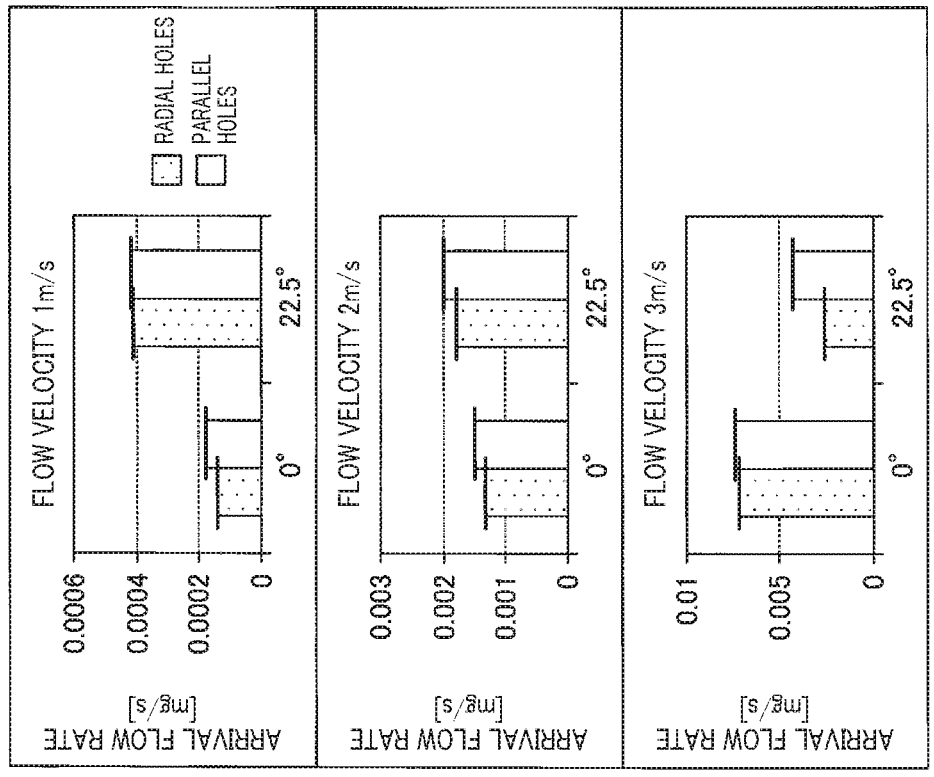

FIG.38
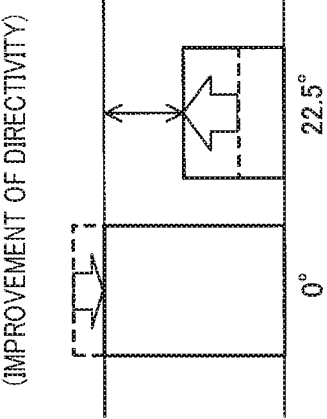
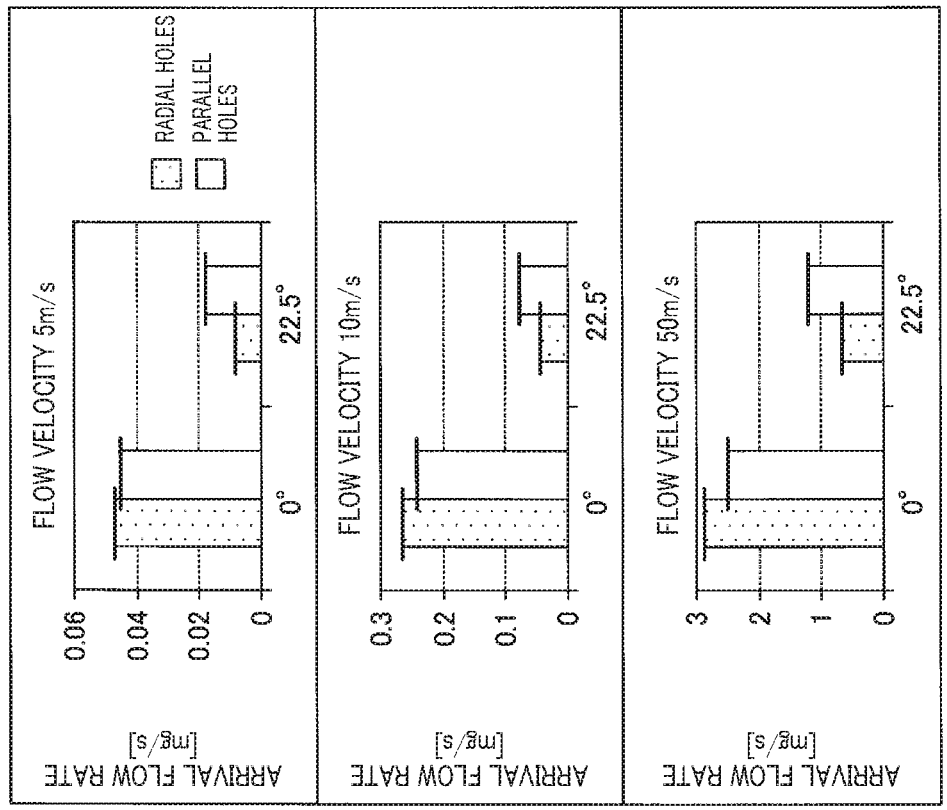

SENSOR DEVICE

This application is the U.S. bypass application of International Application No. PCT/JP2018/043091 filed Nov. 22, 2018 which designated the U.S. and claims priority to Japanese Patent Application No. 2017-229646, filed on Nov. 29, 2017, and Japanese Patent Application No. 2018-180508, filed on Sep. 26, 2018 the contents of which are incorporated herein by reference.

BACKGROUND

Technical Field

The present disclosure relates to a sensor device for detecting specific components in a gas that is under measurement.

Description of the Related Art

An exhaust gas purification system that includes a sensor device for detecting a specific component in an exhaust gas, and a purification device such as a filter device or a catalyst device, is provided in the exhaust gas passage of an internal combustion engine.

SUMMARY

The present disclosure provides a sensor device including a sensor element having a detection section for detecting a specific component in a gas under measurement, a housing having the sensor element inserted into the interior thereof, retained with the detection section positioned at the tip end of the sensor element with respect to the axial direction, and an element cover disposed at the tip end of the housing, with the element cover including an inner cover disposed such as to cover the tip end of the sensor element and an outer cover disposed with a space between the outer cover and the outer periphery of the inner cover.

BRIEF DESCRIPTION OF THE DRAWINGS

The above objects and other objects, features and advantages of the present disclosure will be made clearer by the following detailed description, given referring to the appended drawings.

In the accompanying drawings:

FIG. 37 shows diagrams illustrating the mounting angle of a PM sensor and the effect of improving the detection sensitivity (ultra-low flow velocity range), for comparing the PM sensor of the fifth embodiment with the configuration of the fourth embodiment.

FIG. 38 shows diagrams for comparing the mounting angle of a PM sensor and the effect of improving the detection sensitivity (low flow velocity range~high flow velocity range), for comparing the PM sensor of the fifth embodiment with the configuration of the fourth embodiment.

DETAILED DESCRIPTION OF PREFERRED EMBODIMENTS

Figure 1:
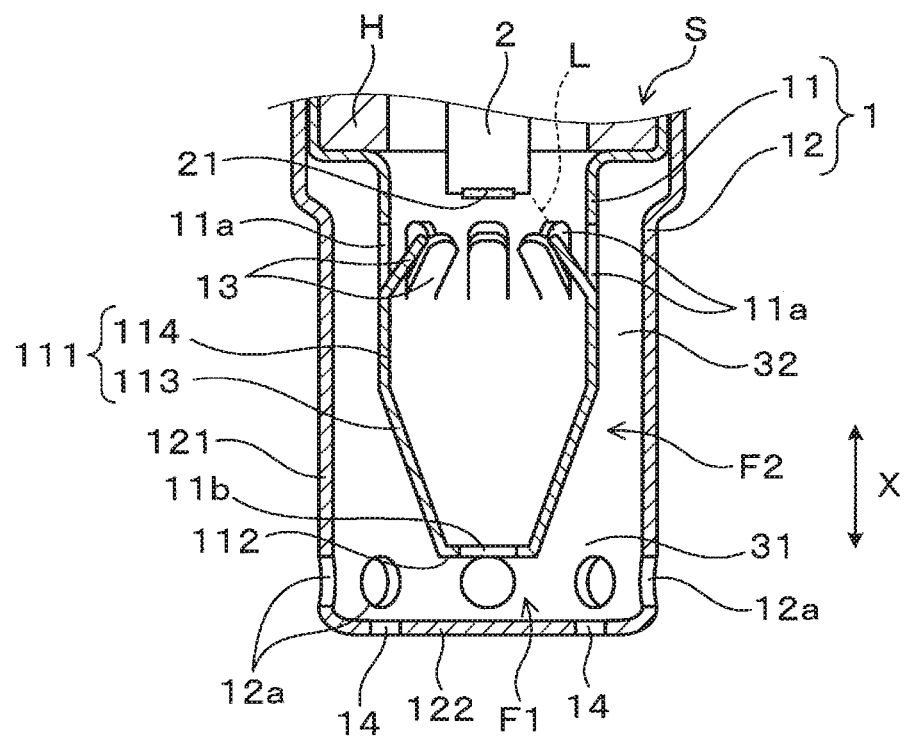
FIG. 1 is an enlarged cross-sectional view, in an axial direction, of a main part of a PM sensor according to a first embodiment.

As a conventional sensor devise, the sensor device is, for example, a particulate matter sensor which detects particulate matter (referred to in the following as PM when appropriate), and is disposed at a position downstream from a filter device which serves to collect PM, for judging whether filter failure occurs. Furthermore, an exhaust gas sensor such as an oxygen sensor is disposed upstream or downstream from the catalyst device.

Such a sensor device generally includes a sensor element that is seated in a housing, protruding therefrom, and an element cover that surrounds the outer periphery of the sensor element. The sensor element includes a detection unit at the tip (the protruding end) thereof, which is protected by the element cover, and detects a specific component contained in an exhaust gas that is introduced into the element cover. The element cover is generally configured as a single or double container.

For example, a PM sensor is known in the prior art having a configuration in which a detection unit of the sensor element is disposed facing gas flow holes that are provided in the side of an element cover, with the element cover having a single structure. As an example, JP 2016 003927 A discloses a PM sensor, in which the element cover has a double structure, consisting of an inner cover and an outer cover, and gas flow holes formed in the side of the inner cover are positioned further toward the tip end of the inner cover than is the sensor element where the detection unit is disposed on the tip end surface, such that the mounting direction is not restricted. Gas flow holes provided in the side of the outer cover are positioned facing the side of the inner cover, and the exhaust gas is introduced to the sensor element from the gas flow holes in the side of the inner cover via a space between the two covers. Exhaust gas that has come into contact with the sensor element flows out through gas flow holes that are disposed coaxial with the sensor element, in the tip ends of the inner cover and the outer cover.

According to a configuration of conventional element cover in the sensor device described in the above-described patent literature, it has been found that mounting the sensor device is facilitated, but that the detection sensitivity and output response of the sensor element are insufficient. In particular, an improvement is required in the detection sensitivity of the PM sensor under the operating conditions of an internal combustion engine when the exhaust gas has a low flow velocity, for example when starting the internal combustion engine, since particulate matter is readily discharged at that time, and, since the gas flow velocity within the element cover becomes decreased, there is a decrease in the flow rate at which exhaust gas containing particulate matter is supplied to the sensor element. The above patent literature also describes an example of rectifying members that are provided in the gas flow holes, however that does not necessarily have a sufficient effect. Furthermore, in that case too, when applied to an exhaust gas sensor, a lowering of the flow velocity of the exhaust gas causes the output response to deteriorate.

Moreover, water condensate is readily produced in the exhaust gas passage of an engine at the time of engine starting. With a conventional element cover configuration, gas flow holes are disposed coaxial with the gas sensor element in the tip ends of the inner cover and the outer cover, enabling water condensate to enter the inner cover from the tip end and to adhere to the sensor element, causing a danger that cracking of the element (referred to in the following as water cracking) may be caused by the adhering water.

Hereinafter, with reference to the drawings, embodiments of the present disclosure will be described.

First Embodiment

Figure 2:
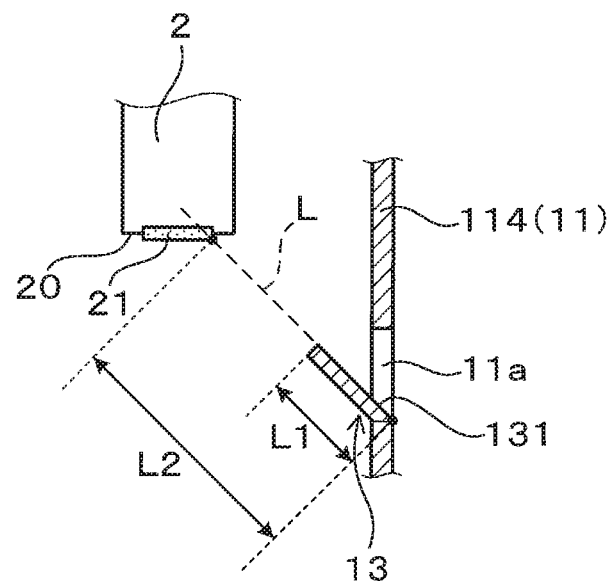
FIG. 2 is a schematic diagram showing a positional relationship between a guide member provided on an inner cover of a particulate matter detection sensor and a detection surface of a sensor element of the first embodiment.
Figure 3:
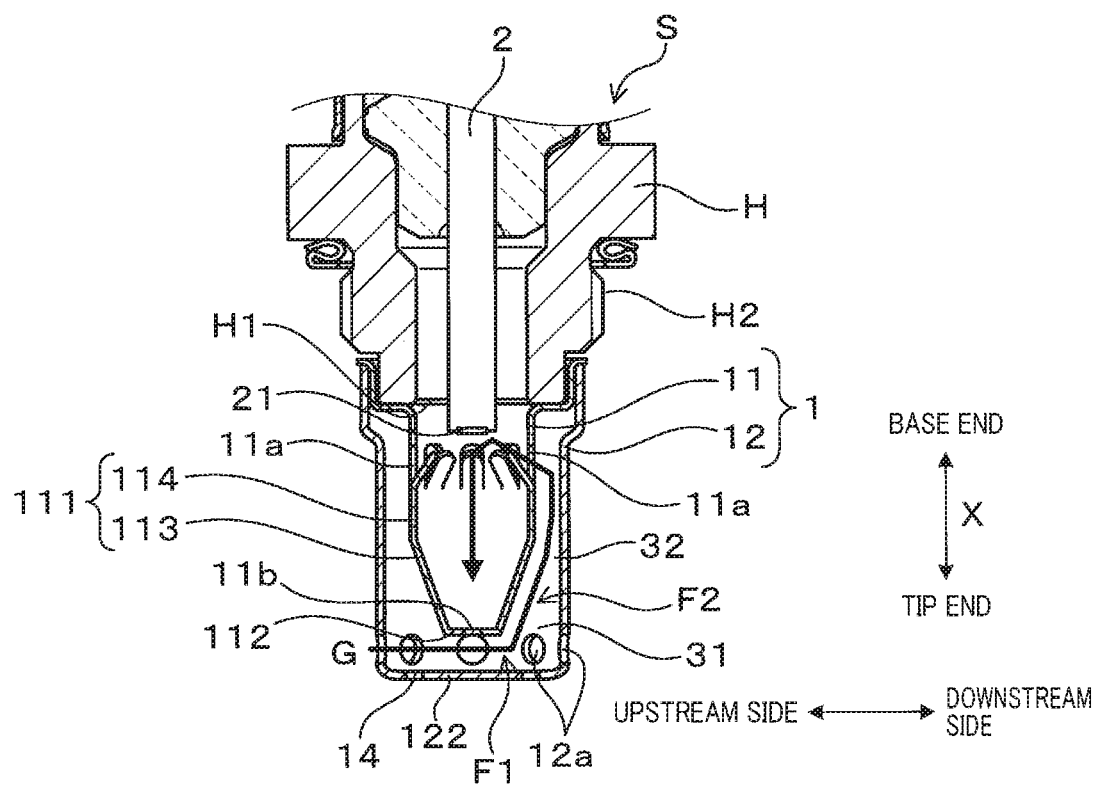
FIG. 3 is a cross-sectional view in an axial direction, schematically illustrating the configuration of a PM sensor according to the first embodiment.

Embodiments of a sensor device will be described in the following, referring to the drawings. As shown in FIGS. 1 to 3, a sensor device according to the present embodiment is a PM sensor S for detecting particulate matter, and is applied, for example, in an exhaust gas purification device of an internal combustion engine E shown in FIG. 4. In FIG. 1, the PM sensor S includes a sensor element 2 having a detection unit 21, a housing H into which the sensor element 2 is inserted and is retained therein with the detection unit 21 positioned at the tip end of the sensor element 2 with respect to an axial direction X, and an element cover 1 disposed at the tip end of the housing H.

The internal combustion engine E is, for example, an automobile diesel engine or a gasoline engine, and the detection unit 21 of the sensor element 2 detects particulate matter that is a specific component contained in the exhaust gas, which is the gas to be measured. The axial direction X of the PM sensor S is shown as the vertical direction in FIGS. 1 and 3, with the tip end as the lower end and the base end as the upper end. Furthermore, concerning the flow directions of the exhaust gas G shown in FIG. 3, the leftward side in the diagram is the upstream side and the rightward side is the downstream side In FIG. 1, the element cover 1 has an inner cover 11 disposed coaxial with the PM sensor S such as to cover the tip end of the sensor element 2 with respect to the axial direction X, and an outer cover 12 disposed outside the inner cover 11, with a space between the inner cover 11 and the outer cover 12. Inner side holes 11a and an inner tip surface hole 11b, through which the gas to be measured flows, are provided in the side 111 and in the tip surface 112 of the inner cover 11 respectively. Furthermore, the outer cover 12 is provided with a plurality of outer side holes 12a in the side 121, through which the gas to be measured flows, with the tip position of the outer side holes 12a being closer to the tip end than is the tip position of the inner cover 11, and a first flow passage F1 is formed at the inner side of the tip surface 122 of the outer cover 12, with the direction of gas flow through the first flow passage F1 being at right angles to the axial direction X.

The inner side hole 11a is open to a second flow passage F2, which is provided between the outer side of the inner cover 11 and the inner side of the outer cover 12. In addition, guide members 13 are provided which extend from the tip edge of each inner side hole 11a toward the interior of the inner cover 11, at an inclination such that, as shown in FIG. 2, a detection surface 20, on which the detection unit 21 is disposed, is positioned on an extension line L that lies along the extension direction of the guide member 13. The configuration of the element cover 1 is described in detail hereinafter.

Figure 4:
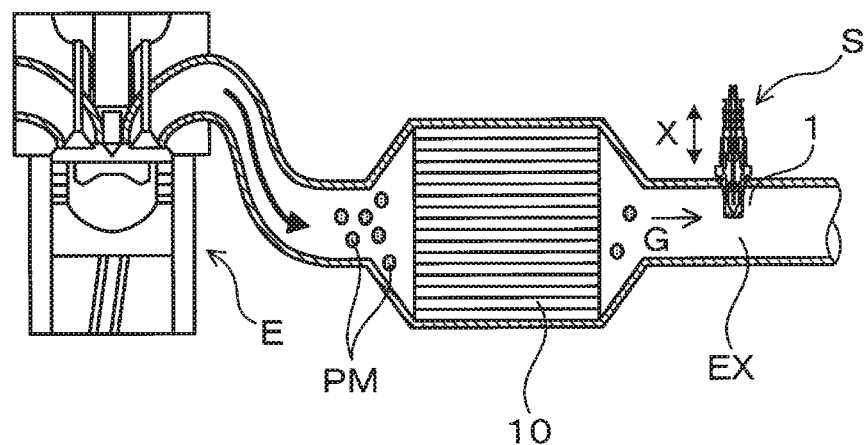
FIG. 4 is a diagram showing the schematic configuration of an example of an exhaust gas purification system that includes a PM sensor according to the first embodiment.

As shown in FIG. 3, the PM sensor S houses the sensor element 2 coaxially in a cylindrical housing H, and the detection unit 21 of the sensor element 2, which protrudes from the tip end opening H1 of the housing H, is protected by the element cover 1, which is attached such as to cover the tip end opening HE The PM sensor S is, for example, screw-attached to the exhaust pipe wall of the internal combustion engine E shown in FIG. 4, by a screw member H2 provided on the outer periphery of the housing H, with the tip end of the PM sensor S positioned protruding into the exhaust gas passage EX.

In FIG. 4, a diesel particulate filter (hereinafter referred to as DPF) 10 is installed in the center of the exhaust gas passage EX, the PM sensor S is disposed in a downstream side of the DPF 10 and detects particulate matter contained in the exhaust gas G (that is, the PM shown in the figure). The particulate matter that passes through the DPF 10 can thereby be detected and, for example, part of an abnormality diagnosis system for the DPF 10 can thus be configured. At positions downstream from the DPF 10, the flow direction of the exhaust gas G is at right angles to the axial direction X of the PM sensor S.

Figure 5:
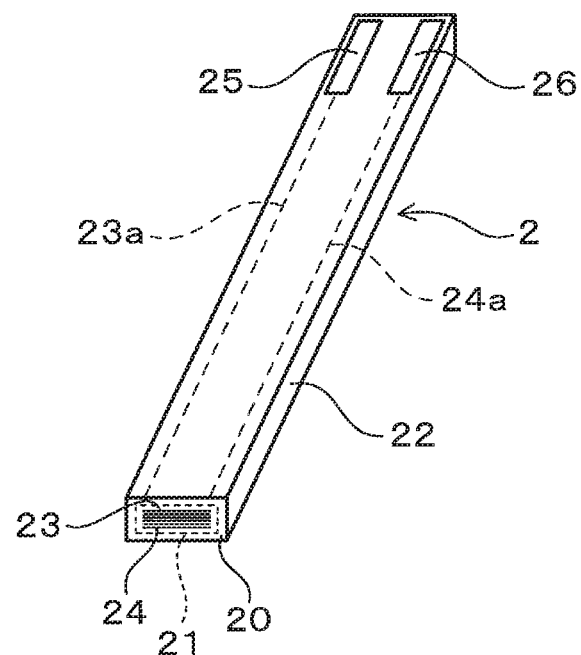
FIG. 5 is an overall perspective view showing an example of a sensor element of the PM sensor according to the first embodiment.

As shown in FIG. 5, the sensor element 2 is a laminated element having a laminated structure, and has a detection surface 20 as the tip surface of an insulating substrate 22, having the shape of a rectangular parallelepiped. A detection unit 21 on which electrodes 23 and 24 are exposed, is disposed on the detection surface 20.

The insulating substrate 22 is formed, for example, by firing a laminate in which electrode films that are to constitute the electrodes 23 and 24 are arranged in alternation between a plurality of insulating sheets, that will constitute the insulating substrate 22. At this time, the edges of the electrodes 23 and 24 are at least partially buried in the insulating substrate 22 and are linearly exposed on the tip surface of the insulating substrate 22, and constitute a plurality of electrode pairs that are composed of linear electrodes having alternately different polarities.

The linear electrodes forming the plurality of electrode pairs are arranged in parallel at intervals on the rectangular-shaped tip surface of the insulating substrate 22, excluding the outer peripheral edge, of the to form the detection unit 21. The detection unit 21 is, for example, the region surrounded by a dotted line in the drawing, and includes a plurality of electrode pairs which face one another across an insulating layer that is sandwiched between them, and a part of the insulating sheet that positioned at the outer periphery of the plurality of electrode pairs. Lead portions 23a and 24a connected to the electrode films that become the electrodes 23 and 24 are disposed Inside the insulating substrate 22, with the lead portions 23a and 24a being connected to terminal electrodes 25 and 26 that are formed on the surface at the base end of the insulating substrate 22. When a predetermined detection voltage is applied to the electrodes 23 and 24, the detection unit 21 electrostatically collects particulate matter in the exhaust gas G that reaches the surface of the detection unit 21.

The detection surface 20 is a region that is slightly larger than the detection unit 21, with the entire tip surface of the insulating substrate 22. including the outer peripheral edge of the detection unit 21, constituting the detection surface 20. This is due to the fact that if the exhaust gas G reaches the outer peripheral edge of the detection surface 20, the exhaust gas G can readily reach the front of the detection unit 21, passing along the surface of the detection unit 21, and hence the area that is to constitute the detection surface 20 can be appropriately determined.

Figure 6:
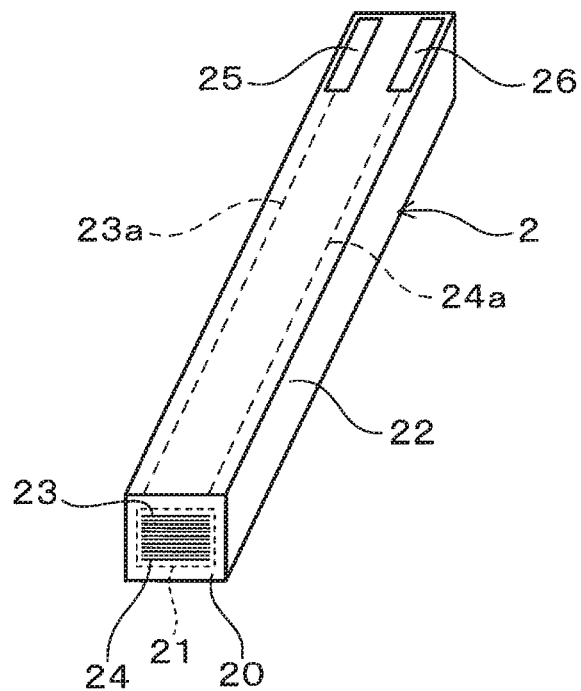
FIG. 6 is an overall perspective view showing another example of the sensor element of the PM sensor according to the first embodiment.

As shown in FIG. 6 for another example, the sensor element 2 may have a rectangular parallelepiped shape, in which the tip surface of the insulating substrate 22 is substantially square. In this case too, the entire front surface of the square-shaped tip surface becomes the detection surface 20, with the detection unit 21 being disposed in an area that excludes the outer peripheral edge. A greater number of linear electrodes than for the sensor element 2 shown in FIG. 5 are disposed on the surface of the square-shaped detecting section 21, arranged in parallel with spaces between them, to form a predetermined number of electrode pairs.

The insulating substrate 22 can be formed using, for example, an insulating ceramic material such as alumina. In addition, the electrodes 23 and 24, the lead portions 23a and 24a, and the terminal electrodes 25 and 26 can be configured using a conductive material such as a noble metal, for example.

In FIGS. 1 and 3, the element cover 1 has a double-wall container shape, with the housing H side open, and includes an inner cover 11 and an outer cover 12 which are disposed coaxially. The outer cover 12 has a side 121 formed of a cylindrical body having a substantially constant diameter, and a tip surface 122 which closes the cylindrical body, while the inner cover 11 is disposed with a space between it and the outer cover 12, and has a side 111 formed of a cylindrical body and a tip surface 112 which closes the cylindrical body. The base end of the inner cover 11 is an enlarged diameter portion which is in close contact with the base end of the outer cover 12, and is integrally attached to the tip end of the housing H.

The outer cover 12 is provided with a plurality of outer side holes 12a in the side 121 near the tip surface 122. In the present embodiment, the outer side holes 12a are located at positions that do not overlap the inner tip surface hole 11b, with respect to the axial direction X. For example, the tip end position of the inner tip surface hole 11b and the base end position of the outer side holes 12a are at the same position. A first flow passage F1 is formed inside the tip surface 122 of the outer cover 12 between the tip surface 112 of the inner cover 11 and the tip surface 122, through which the exhaust gas G flows in a direction at right angles to the axial direction X. The flow passage F1 through which the exhaust gas G can flow may be formed such that the outer side holes 12a are located farther toward the tip end than is the inner tip surface hole 11b, which is at the tip of the inner cover 11. Preferably, the centers of the outer side holes 12a are disposed such as to be farther toward the tip end than the inner tip surface hole 11b, in which case the flow rate of the exhaust gas G flowing through the first flow passage F1 is increased, and a flow of gas into the second flow passage F2 can readily be formed.

The outer side holes 12a are, for example, circular through holes which open to the first flow passage F1. Although the number and arrangement of the outer side holes 12a are not necessarily limited, it is preferable that the outer side holes 12a are arranged uniformly around the entire periphery of the side 121, for example disposed at eight positions at equal spacings in a circumferential direction. By doing so, the configuration has no directivity with respect to the gas flow, and not only is mounting facilitated, but also the flow rate of the gas flow formed in the second flow passage F2 is stabilized, and the detection accuracy is improved.

For the tip end surface 112 of the outer cover 12, a plurality of drain holes 14 are provided in an outer peripheral part which does not face the inner tip surface hole 11b. The drain holes 14 are small holes for discharging, to the exterior, water that has condensed within the element cover 1, and are made sufficiently small with respect to the outer side holes 12a through which the exhaust gas mainly flows.

The second flow passage F2 is provided between the outer surface of the inner cover 11 and the inner surface of the outer cover 12. The second flow passage F2 has a large clearance portion 31 on the outer peripheral side of the tip end 112 of the inner cover 11, as the maximum clearance amount. A small clearance portion 32, having the minimum clearance amount, is provided, at the base end of the large clearance portion 31, and the large clearance portion 31 and the small clearance portion 32 have flow passage shapes that are connected without a step between them.

The cylindrical body constituting the side 111 of the inner cover 11 has a tapered first cylindrical portion 113 which extends continuously from the tip end 112 and whose diameter increases toward the base end, and a second cylindrical portion 114 having a substantially constant diameter, which extends continuously from the first cylindrical portion 113 to the base end. The first cylindrical portion 113 is a tapered surface having a fixed taper angle, and the large clearance portion 31 is formed between the first cylindrical portion 113 and the outer cover 12, at the tip end. The small clearance portion 32 is formed between the second cylindrical portion 114 and the outer cover 12.

The large clearance portion 31 is a portion where the clearance amount in a direction orthogonal to the axial direction X, that is, the distance between the outer surface of the inner cover 11 and the inner surface of the outer cover 12, is the maximum. In the second flow passage F2, facing the first cylindrical portion 113, the clearance amount decreases from the large clearance portion 31 at the tip end toward the base end.

The small clearance portion 32 is a portion where the clearance amount in a direction orthogonal to the axial direction X, that is, the distance between the outer surface of the inner cover 11 and the inner surface of the outer cover 12, is the minimum. In the second flow passage F2 facing the second cylindrical portion 114, there is a constant clearance from the tip end to the base end, which is the minimum clearance constituted by the small clearance portion 32.

A plurality of inner side holes 11a are provided in the inner cover 11, at an intermediate part of the second cylindrical portion 114, with respect to the axial direction X, which constitutes the base side 111. The inner side holes 11a may be, for example, long through holes that are elongated in the axial direction X, and are open to the second flow passage F2. Each of the plurality of inner side holes 11a is provided with an elongated plate-like guide member 13, which is formed integrally with the tip edge of that inner side hole. Both the base edge of an inner side hole 11a and the extended end of a guide member 13 have rounded shapes, with chamfered corners at both ends with respect to the width direction. A single inner tip surface hole 11b is provided at the center of the tip surface 112. The inner tip surface hole 11b is, for example, a circular through-hole and is open to the first flow passage F1.

Figure 7:
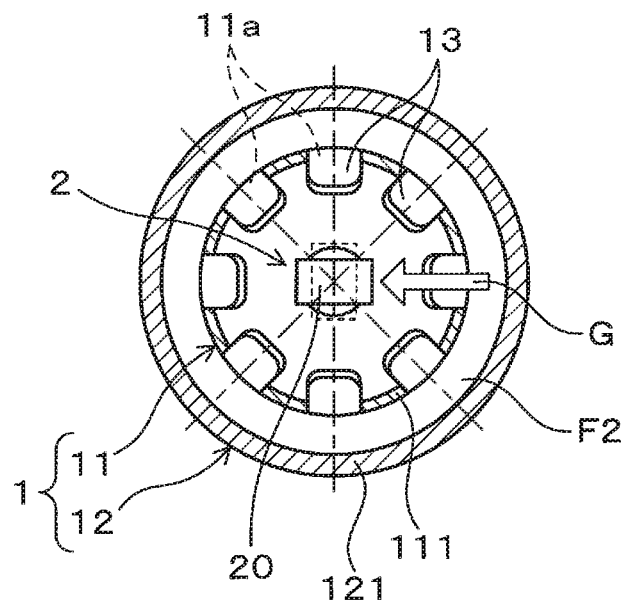
FIG. 7 is an enlarged cross-sectional view in a radial direction of a main part of the PM sensor according to the first embodiment, including an example of the sensor element of the PM sensor.

The number and arrangement of the inner side holes 11a are not necessarily limited, but it is preferable that the inner side holes 11a are arranged uniformly around the entire circumference of the side 111. For example, as shown in FIG. 7, the inner side holes 11a can be arranged at eight positions in a circumferential direction of the side 111, disposed at equal spacings. The guide members 13 provided in the inner side holes 11a are radially arranged such as to surround the detection surface 20 of the sensor element 2. This prevents the configuration from having directivity with respect to the gas flow, and not only facilitates mounting, but also enables the exhaust gas G, flowing from the second flow passage F2 through the guide members 13, to be guided to the detection surface 20 without a lowering of the flow velocity, thereby enhancing the detection accuracy.

Figure 8:
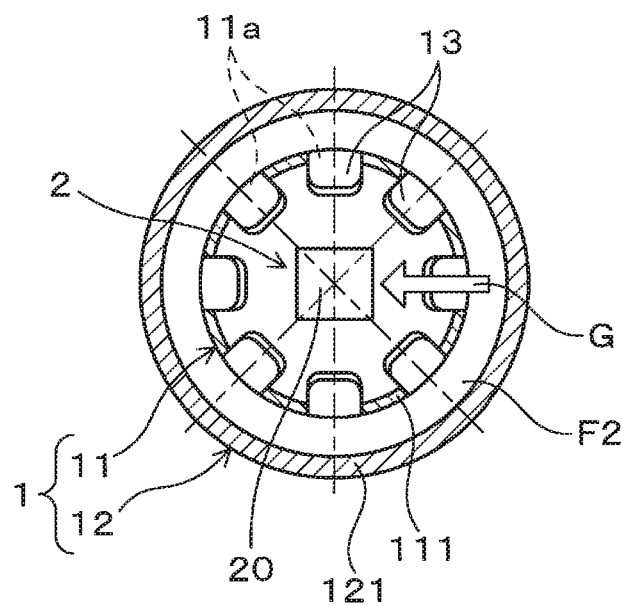
FIG. 8 is an enlarged cross-sectional view in a radial direction of a main part of the PM sensor according to the first embodiment, including another example of the sensor element of the PM sensor.

It should be noted that if, as shown in FIG. 7, the disposition is such that the inner side hole 11a through which there is an inflow of the exhaust gas G is positioned in the direction of an elongated side, with respect to a detection surface 20 that is rectangular, that inner side hole 11a becomes close to the tip of the guide member 13, thereby increasing the rate of flow of the exhaust gas G to the detection surface 20. Furthermore, as shown in FIG. 8, if a sensor element 2 having a square detection surface 20 is used (for example, see FIG. 6), then irrespective of the mounting angle, there is a substantially constant distance between the detection surface 20 and the inner side hole 11a through which the exhaust gas G flows at a high rate, so that an effect of improved directivity is obtained.

As shown in FIG. 2, the guide members 13 are provided integrally with the leading edges of the inner side holes 11a. For example, each guide member 13 may be formed as a cutout portion that is obtained by cutting out a part of the second cylindrical portion 114 such that the cutout portion is integrated with the tip edge of an inner side hole 11a, and bending the cutout portion toward the interior of the inner cover 11 such as to form a inclined surface 131 that extends toward the sensor element 2. The detection surface 20 of the sensor element 2 is positioned closer to the base end than are the inner side holes 11a, with respect to the axial direction X, and each guide member 13 is configured such that the extension line L of the inclined surface 131 is positioned to intersect the detection surface 20. It is sufficient for the extension line L to be a line that extends from the tip of the inclined surface 131 in a direction to intersect with any position on the detection surface 20.

However preferably, as shown in the drawings, the detection unit 21 should be positioned on the extension line L. In that way, since the exhaust gas G is directly introduced toward the detection unit 21, which is located inside the outer peripheral edge of the detection surface 20, the guidance effect can be enhanced and the detection sensitivity can be improved. The position at which the extension line L intersects the detection surface 20 varies depending on the size of the detection surface 20, the length and position of each guide member 13, the inclination angle, etc., and the position can be arbitrarily determined by appropriately adjusting these factors.

Since the guidance effect is small when the guide member 13 is short, it is desirable for the guide member 13 to have a sufficient length for obtaining the guidance effect. Specifically, designating the length from the base end part of the inner side holes 11a, that is, from the base end of a inclined surface 131, to the extending tip of the inclined surface 131 as L1, and the length to the detection surface 20 as L2, these lengths should have a ratio L1/L2 that is greater than 0.25 (i.e., L1/L2>0.25). Details of this relationship are described hereinafter.

Figure 9:
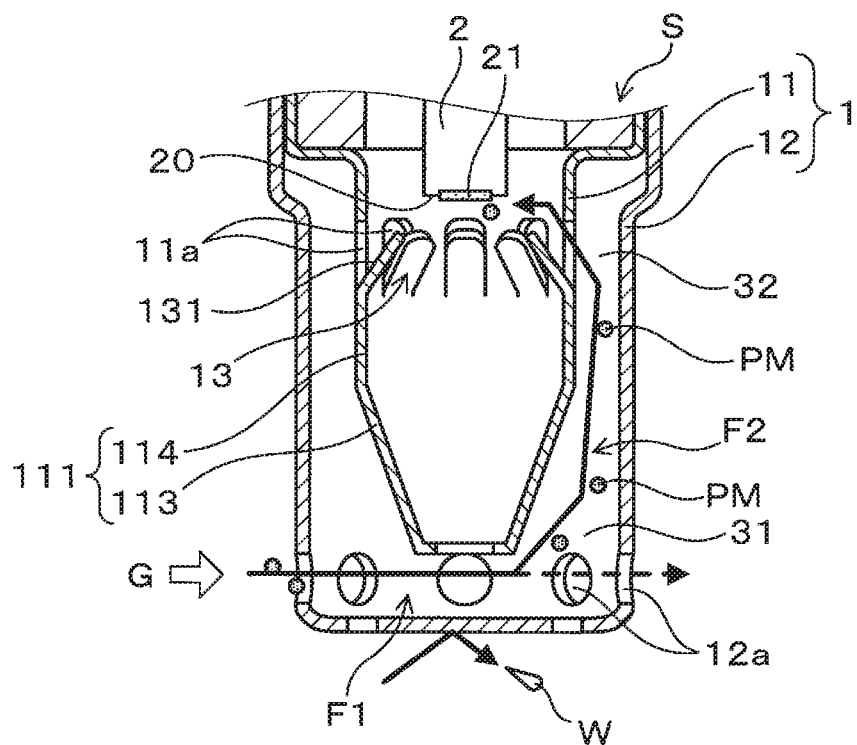
FIG. 9 is an enlarged cross-sectional view of a main part of the PM sensor according to the first embodiment, for describing a gas flow in an element cover.

The effect of the element cover 1 on the detection accuracy of the sensor element 2, and the improvement in water resistance of a PM sensor S that incorporates the element cover 1 having the above configuration, will next be described. As shown in FIG. 9, the exhaust gas G flows from one side of the PM sensor S toward the element cover 1, and is introduced into an outer side hole 12a that is opened in the side 121 of the outer cover 12. Since the outer side holes 12a are positioned closer to the tip end than is the tip position of the inner cover 11, within the element cover 1, the exhaust gas G flows along the first flow passage F1 between the tip surface 112 of the inner cover 11 and the tip surface 122 of the outer cover 12 with a sufficiently high flow rate, heading toward an outer side hole 12a that is located facing the direction of flow (for example, see the dotted arrow in FIG. 9).

In addition, in the large clearance portion 31, at the downstream side with respect to the flow direction, a part of the exhaust gas G changes its direction and heads toward the base end, flowing into a second flow passage F2 between the side 111 of the inner cover 11 and the side 121 of the outer cover 12 (for example, see the thick arrow in FIG. 9).

Since the flow area of the second flow passage F2 in the small clearance portion 32 is smaller than that in the large clearance portion 31 at the downstream side, the flow velocity of the exhaust gas G becomes increased by the Venturi effect as it heads toward the inner side holes 11a, which open to the small clearance portion 32. Furthermore, since the first cylindrical portion 113 of the inner cover 11 is farther toward the tip end than is the second cylindrical portion 114 which forms the small clearance portion 32, and the first cylindrical portion 113 is formed with a tapered shape, becoming smaller in diameter toward the tip end, so that the flow passage area gradually becomes smaller from the large clearance portion 31 to the small clearance portion 32, eddy currents are not readily produced as the exhaust gas G flows along the side 111 of the inner cover 11.

Hence the flow velocity of the exhaust gas G is further increased by the effect of suppressing eddy currents, and the gas reaches the inner side holes 11a at a sufficiently high flow velocity. Furthermore, the gas flows into the interior of the inner cover 11 along the inclined surface 131 of a guide member 13 that is disposed integrally with an inner side hole 11a. The guide member 13 is disposed such that the detection surface 20 of the sensor element 2 is located in the extension direction of the inclined surface 131, and due to the guidance effect of this, the exhaust gas G reaches the detection unit 21 at the tip surface of the sensor element 2 while maintaining a sufficiently high flow velocity. Such a flow of the exhaust gas G increases the supply flow rate per unit of time to the detection unit 21, so that the time required for detecting particulate matter PM when the DPF 10 fails, etc., can be shortened, and the detection sensitivity of the sensor element 2 can be enhanced.

The exhaust gas G then passes toward the inner tip surface hole 11b opened in the tip surface 112 of the inner cover 11 (for example, see the thick arrow in FIG. 3). At this time, as described above, the exhaust gas G flowing in the first flow passage F1, between the tip surface 112 of the inner cover 11 and the tip surface 122 of the outer cover 12, has a sufficiently high flow velocity to produce a negative pressure in the vicinity of the inner tip surface hole 11b.

Figure 10:
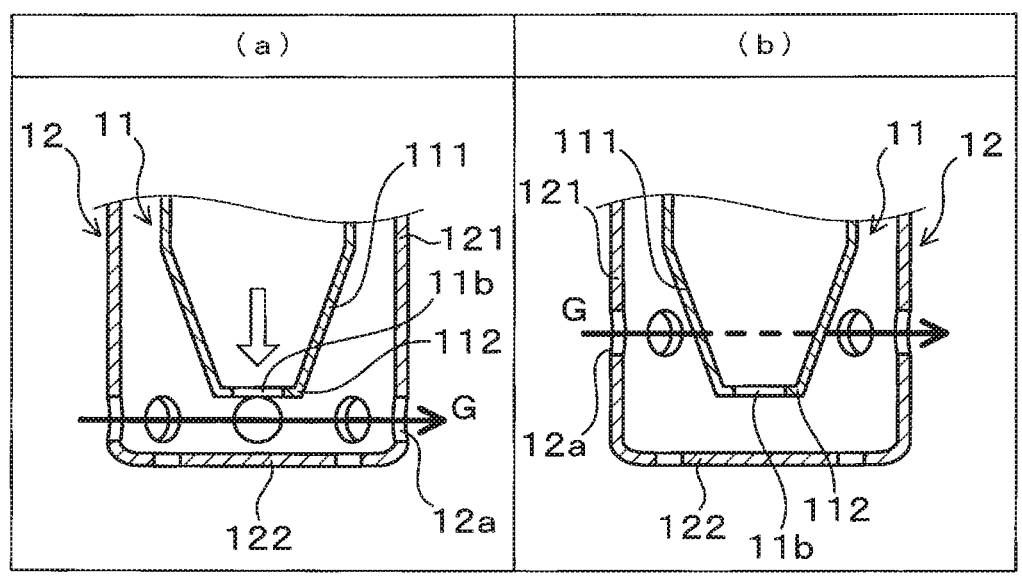
FIG. 10 shows enlarged cross-sectional views of a main part of the element cover according to the first embodiment, for comparing the effect of the gas flow produced by the arrangement (a) of the outer side holes of the element cover in the first embodiment with the gas flow that is produced when the arrangement of the outer side holes is changed to that in diagram (b).

That is, with the configuration of the present embodiment as shown in the left-side diagram (a) of FIG. 10, a current is produced which flows out from the inner tip surface hole 11b into the interior of the outer cover 12, due to the suction effect of the negative pressure. For reference, a configuration is shown in the right-side diagram (b) of FIG. 10 in which the outer side holes 12a are located closer to the base end than is the tip surface 112 of the inner cover 11, and in which the exhaust gas G passes around the periphery of the inner surface 111 and does not flow below the inner tip surface hole 11b, no negative pressure is generated.

However, holes serving as gas flow holes are not formed at positions facing the tip surface 122 of the outer cover 12, in particular, facing the inner tip surface hole 11b, so that the flow direction of the exhaust gas G is at right angles to the axial direction X. The inner tip surface hole 11b does not open to the flow direction of the exhaust gas G, and furthermore, due to the above-described suction effect, a flow is produced that passes out from the inner tip surface hole 11b in a direction for merging with the exhaust gas G, so that the exhaust gas G that has flowed into the outer cover 12 is prevented from flowing directly into the interior of the inner cover 11 through the inner tip surface hole 11b.

Hence, even if water condensate is contained in the exhaust gas G or water condensate adheres to the inside of the outer cover 12, there is little possibility that the water condensate will enter the inner cover 11 together with the exhaust gas G, and reach the sensor element 2. Hence it becomes possible to prevent the problem of cracking caused by the sensor element 2 becoming wet.

Figure 11:
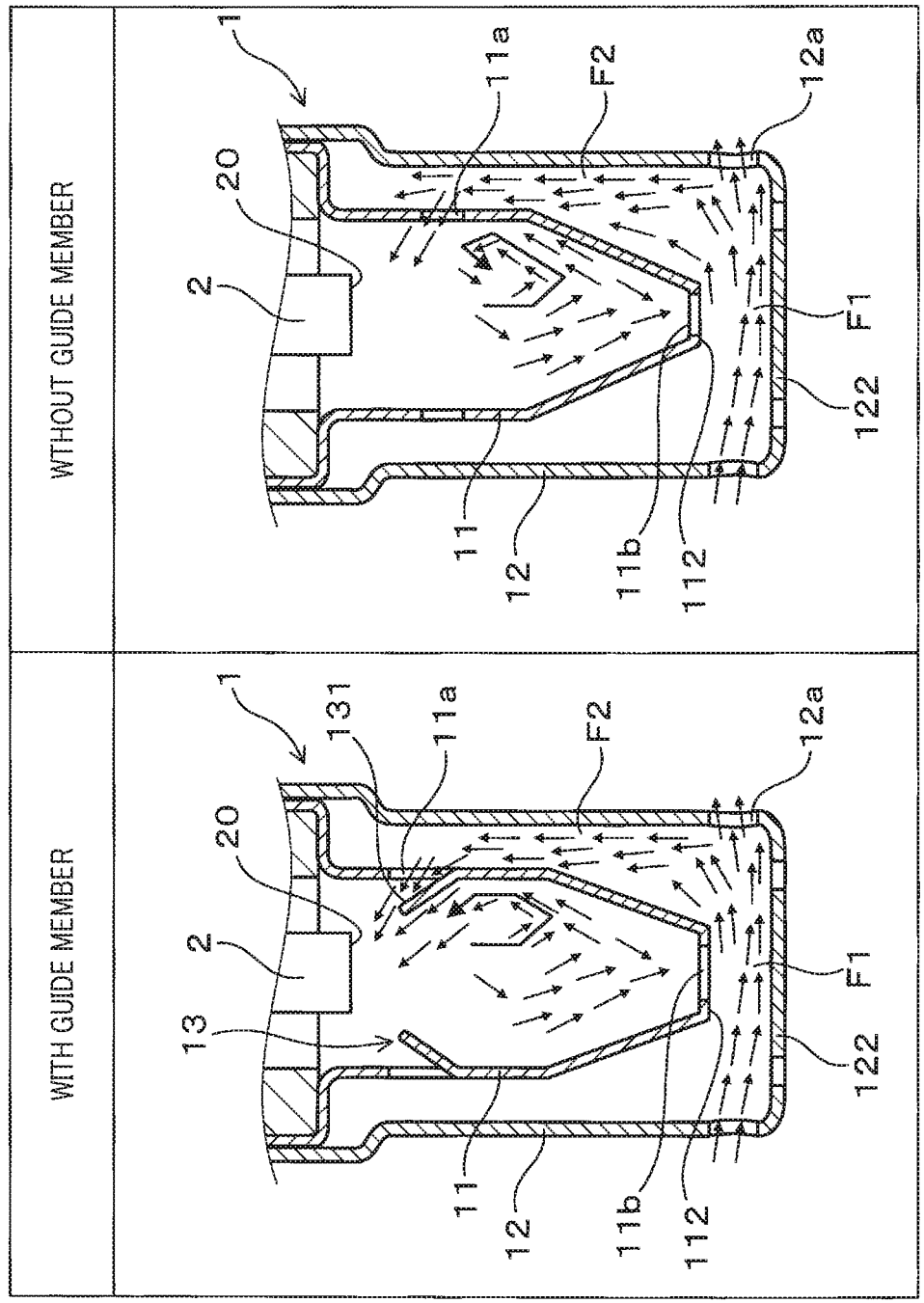
FIG. 11 shows enlarged cross-sectional views schematically illustrating a main part of the particulate matter detection sensor according to the first embodiment, for comparing the gas flow inside an element cover having guide members and the gas flow inside a conventional element cover which does not have guide members, based on the result of CAE analysis.

FIG. 11 shows schematic diagrams for comparing gas flows at a low flow velocity (for example, 10 m/s) within the element cover 1, with and without the guide member 13 respectively, based on CAE (i.e., computer aided engineering) analysis results. In the case of the configuration of the present embodiment, as shown in the left-side diagram of FIG. 11, in addition to suppressing the generation of eddy currents in the second flow passage F2, the effects of eddy currents within the inner cover 11 can be suppressed. That is, together with flowing in the forward direction, a part of the exhaust gas G that has flowed into the outer cover 12 flows smoothly into the large clearance portion 31 just before flowing out of the outer side hole 12a. As this flow passes along the second flow passage F2, the flow velocity increases in the small clearance portion 32 at the base end, and the gas then flows into an inner side hole 11a. The gas then flows along the inclined surface 131 of a guide member 13, becoming a jet stream which flows toward the sensor element 2.

On the other hand, other flows of gas along the guide members 13, which are directed toward the sensor element 2, also occur in the interior of the inner cover 11. That is, as a result of the flow being divided by the guide members 13, flows are produced on both sides, which head in the same direction. Hence the jet streams that pass along the inclined surfaces 131 reach the detection surface 20 without disturbance. In addition, a flow of the exhaust gas G is formed which is directed toward the inner tip surface hole 11b, and which merges with the exhaust gas G that flows along the first flow passage F1 between the two tip surfaces 112 and 122.

On the other hand, as shown for comparison in the right-side diagram of FIG. 11, with a configuration in which the guide members 13 are not provided, an eddy current is formed within the inner space of the inner cover 11, and due to this, there is a large loss of velocity when the gas flows to the inner side holes 11a. Thus, if the flow velocity is not sufficiently increased by generating a jet stream, it is difficult for a flow of gas to reach the detection surface 20, and hence the detection sensitivity of the detection unit 21 is less effectively enhanced. Furthermore, a lowering of the detection sensitivity may occur depending on the mounting angle (the mounting directivity) at the time of mounting the sensor element, and the detection accuracy may also be reduced.

<Evaluation of Mounting Directivity>

Figure 12:
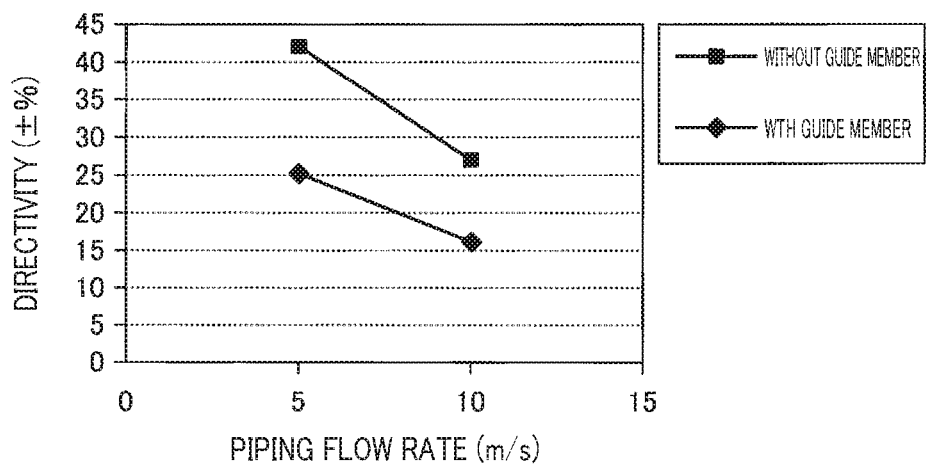
FIG. 12 is a diagram based on directivity evaluation tests showing a comparison of the relationships between pipe flow velocity and directivity, for the cases of presence and absence of guide members respectively.

The reduction in detection sensitivity due to the mounting angle at the time of mounting was evaluated for a PM sensor S having an element cover 1 configured in accordance with the present embodiment. In the evaluation test, the PM model gas bench shown in FIG. 4 was used, simulating an exhaust gas purifying apparatus, with a PM sensor S being installed in a pipe through which a model gas containing particulate matter flowed, and the variation of detection sensitivity with respect to changes in the mounting angle, made by rotating the sensor about its central axis, was investigated. For comparison, a configuration in which the guide members 13 were not provided in the element cover 1 was similarly evaluated, and the comparison results are shown in FIG. 12.

Figure 13:
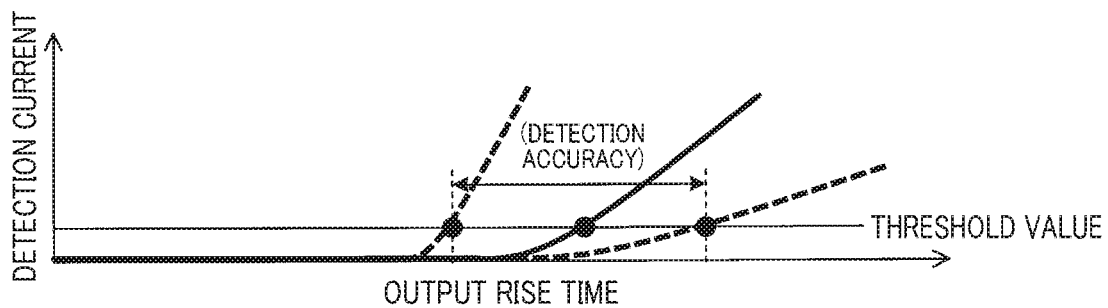
FIG. 13 is a diagram based on directivity evaluation tests showing relationships between output rise time and detection current.

Prior to the evaluation test, the detection unit 21 of the sensor element 2 was regenerated by heating, to remove PM on the surface, and a predetermined electrostatic collection voltage was then applied between the electrodes 23 and 24, and the output rise time (that is, the detection sensitivity) was measured. As shown in FIG. 13, the rise time of the output is the time required for the detection current of the detection unit 21 to exceed a preset threshold value, when particulate matter is collected electrostatically and conduction occurs between the electrodes 23 and 24. The smaller the extent to which the rise time varies when the mounting angle of the PM sensor S is changed, by changing the mounting direction of the element cover 1 (that is, the smaller the directivity), the better is the detection accuracy.

In FIG. 13, the directivity is expressed as an amount of variation (units: ±%) of rise time with respect to a median of measured rise time values. When the guide members 13 are not provided in the element cover 1, the directivity is high, and exceeds ±25% when the flow velocity of the exhaust gas G introduced into the element cover 1 (that is, the pipe flow velocity) is 10 m/s. When the pipe flow velocity is reduced to 5 m/s, the directivity is further increased, and exceeds ±40%. On the other hand, when an element cover 1 having the guide members 13 is used, the directivity becomes smaller, and is of the order of ±15% when the pipe flow velocity is 10 m/s, and is about ±25% even when the pipe flow velocity is 5 m/s, and hence the directivity becomes substantially reduced. It is presumed that this is due to the effect of the jet streams along the guide members 13 described above, which increases the flow velocity at which the gas reaches the detection surface 20 and reduces the effect of the mounting direction of the element cover 1, enabling an improvement in the detection accuracy to be obtained.

<Evaluation of Wetness>

Figure 14:
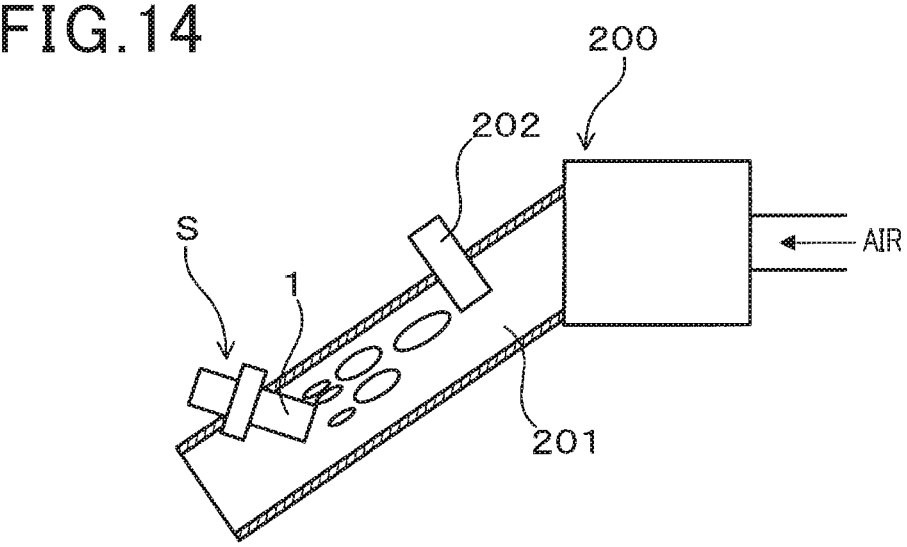
FIG. 14 is a schematic diagram of an evaluation apparatus for explaining a test method used in wetness evaluation tests.

The water resistance of a PM sensor S having an element cover 1 configured in accordance with the present embodiment was evaluated using the evaluation apparatus 200 shown in FIG. 14. The evaluation apparatus 200 has a flow passage 201 through which air flows, a liquid feed pump 202 for water injection, disposed on a pipe wall that forms the flow passage 201, and a PM sensor S disposed downstream from the liquid feed pump 202. The PM sensor S is mounted obliquely, such that the tip end is directed to the upstream side, and the maximum amount of water reaching the detection unit 21 of the sensor element was measured under the condition that water droplets W supplied by the liquid feed pump 202 were injected into the interior of the element cover 1. The wetness of a PM sensor Si having an element cover 100 with the conventional configuration shown in FIG. 15 was similarly evaluated, and the comparison results are shown in FIG. 12.

Air flow velocity: 12 m/s
Air temperature: 280±20° C.
Element cover temperature: 250° C.

Figure 15:
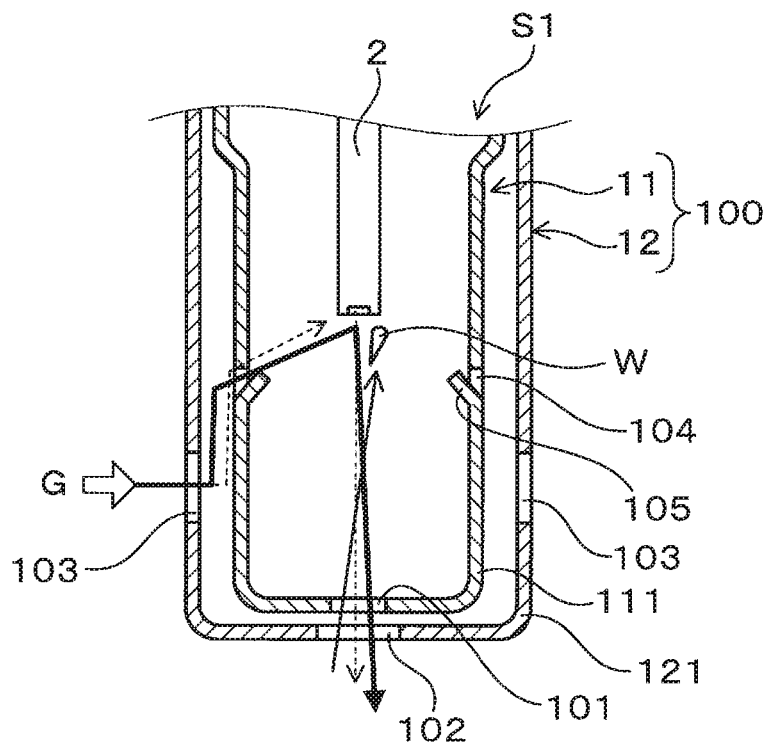
FIG. 15 is an enlarged cross-sectional view of a main part of a PM sensor that includes a conventional element cover used in a wetness evaluation test.

As shown in FIG. 15, the element cover 100 having the conventional configuration does not have the first flow passage F1, and the tip surface hole 101 of the inner cover 11 and the tip surface hole 102 of the outer cover 12 are coaxially disposed close to one another. The configuration is such that the exhaust gas G heads from the gas flow holes 103, in the side 121 of the outer cover 12, to the gas flow holes 104 in the side 111 of the inner cover 11, which are located closer to the base end than the gas flow holes 103. A small rectifying member 105 that slopes inward is provided in each gas flow hole 104 such as to face the side of the sensor element 2.

Figure 16:
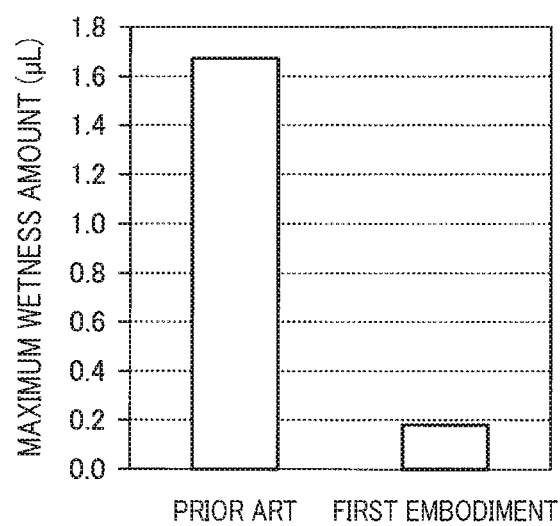
FIG. 16 is a diagram showing a comparison between the maximum wetness of the PM sensor of the first embodiment and that of a PM sensor having a conventional element cover, based on the wetness evaluation test.

As shown in FIG. 16, the maximum amount of wetness when the element cover 100 with the conventional configuration was used exceeded 1.7 µL, whereas when the element cover 100 of the present embodiment was used, the maximum amount of wetness was approximately 0.2 µL, so that a significant reduction effect of approximately 88% was observed. Since in that way, with the present embodiment, the outer cover 12 has only the drain holes 14 in the outer peripheral part of the tip surface 122, and none of these holes faces the inner tip surface hole 11b in the inner cover 11, air does not flow directly in from the tip end. With such a configuration it is possible to prevent the sensor element 2 from becoming wet, and to prevent water cracking.

<Evaluation of Extension Direction of Guide Members 13>

Figure 17:
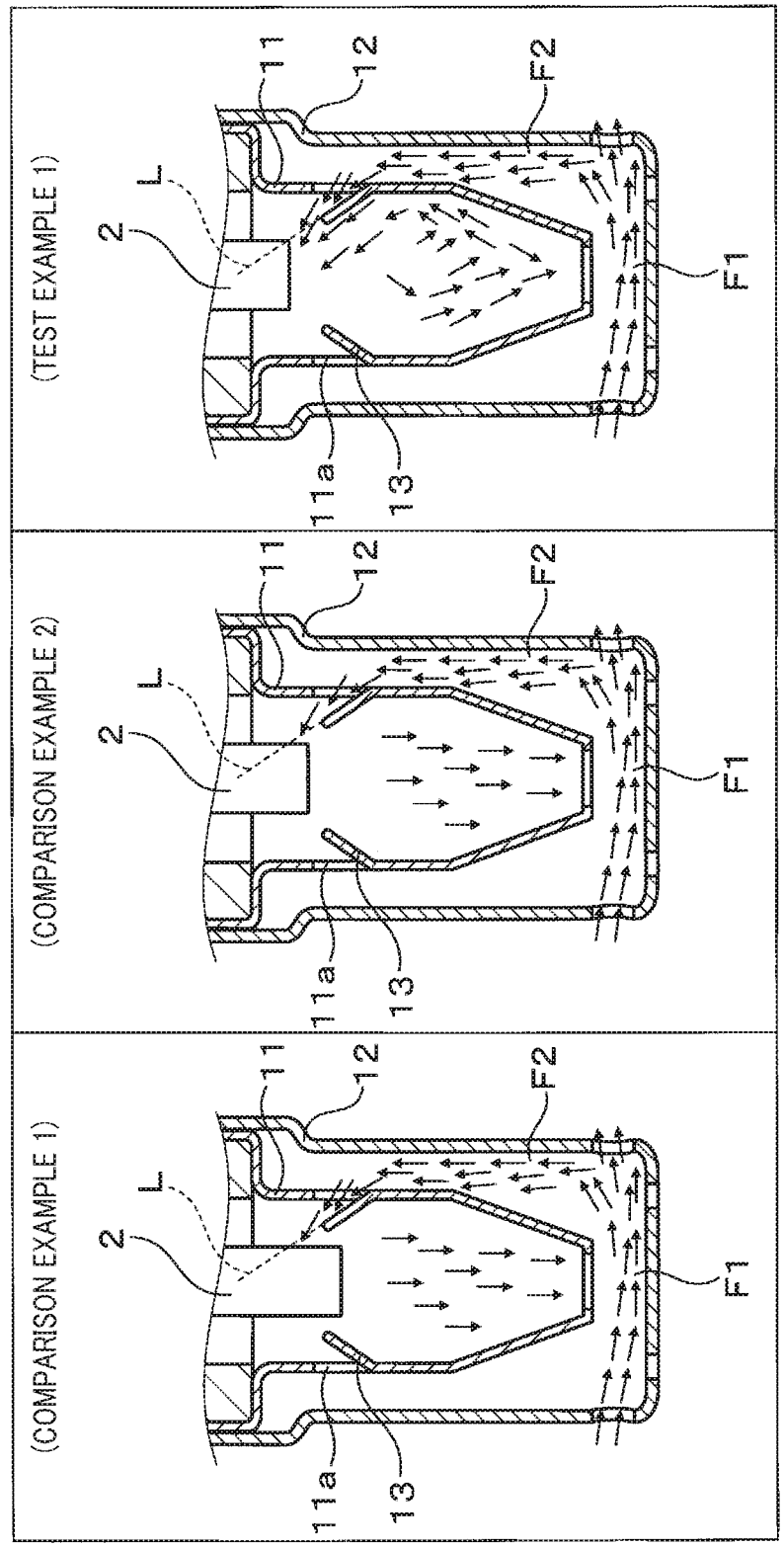
FIG. 17 is a diagram showing positional relationships between the extension direction of a guide member and a sensor element, for comparing first and second comparison examples in evaluation tests of guide members.

As shown in FIG. 17, the flow rate of the exhaust gas G introduced to the detection surface 20 was evaluated when the position of the sensor element 2 of a PM sensor S utilizing the element cover 1 of the present embodiment was varied in the axial direction, to change the position of the sensor element 2 relative to the inclined surfaces 131 of the guide members 13. The right-side diagram in FIG. 17 shows Test Example 1, having the configuration of the present embodiment whereby the extension line L of the inclined surface 131 and the detection surface 20 of the sensor element 2 intersect. As opposed to this, as shown in the left-side diagram of FIG. 17, a configuration in which the extension line L of a inclined surface 131 is positioned somewhat farther toward the base end than is the tip surface of the sensor element 2 is designated as Comparison Example 1, while as shown in the center diagram of FIG. 17, a configuration in which the side of the tip part of the sensor element 2 is positioned on the extension line L of the inclined surface 131 is designated as Comparison Example 2.

Figure 18:
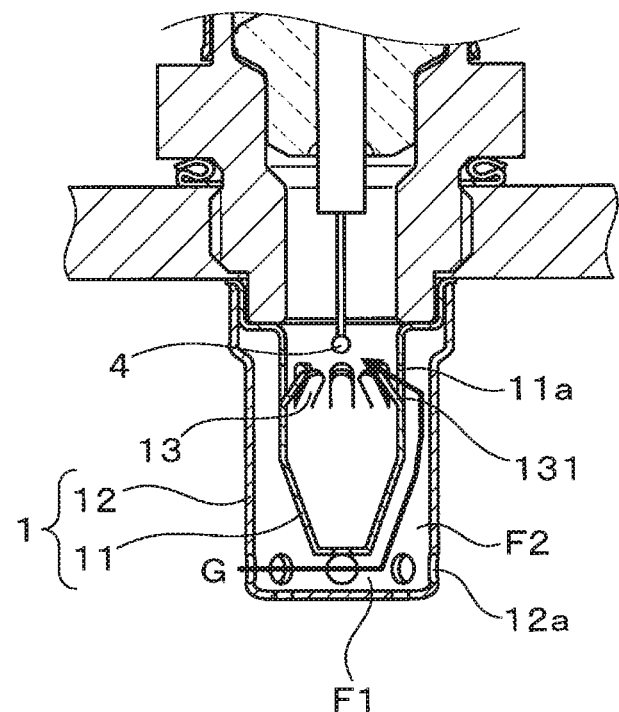
FIG. 18 is a cross-sectional view schematically illustrating the general configuration of an evaluation apparatus used for measuring flow rate in evaluation tests of guide members.
Figure 19:
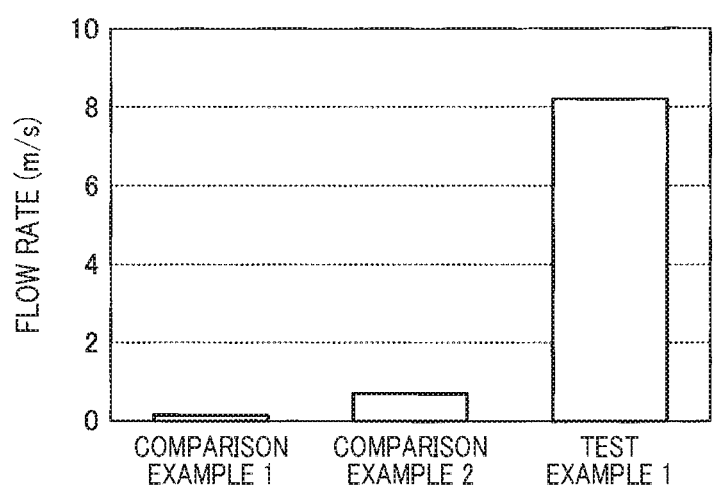
FIG. 19 is a diagram showing a comparison between the flow rate of a first test example and the flow rates of first and second comparison examples, from guide member evaluation tests.

As shown in FIG. 18, an evaluation apparatus was prepared in which an anemometer 4 was disposed at the position of the detection surface 20 instead of the sensor element 2, within the element cover 1, and the flow rates obtained for the cases of the PM sensors S of Test Example 1, Comparison Example 1 and Comparison Example 2 were respectively measured, at a constant pipe flow velocity (for example, 10 m/s). As shown in FIG. 19, the flow velocity measured by the anemometer 4 increases in accordance with increasing closeness to the anemometer 4, in the sequence Comparison Example 1, Comparison Example 2, with velocities of approximately 0.2 m/s and approximately 0.7 m/s respectively, each of which is significantly lower than 1 m/s. On the other hand in the case of Test Example 1, in which the inclined surface 131 extends toward the position of the detection surface 20, the flow velocity is greatly increased, to approximately 8.2 m/s.

In that way, it has been confirmed that by using a configuration such that the detection surface 20 of the sensor element 2 is positioned on the extension line L of an inclined surface 131, the exhaust gas G can be introduced to the detection surface 20 at a sufficient flow rate.

<Evaluation of Length L1 of Guide Member 13>

Figure 20:
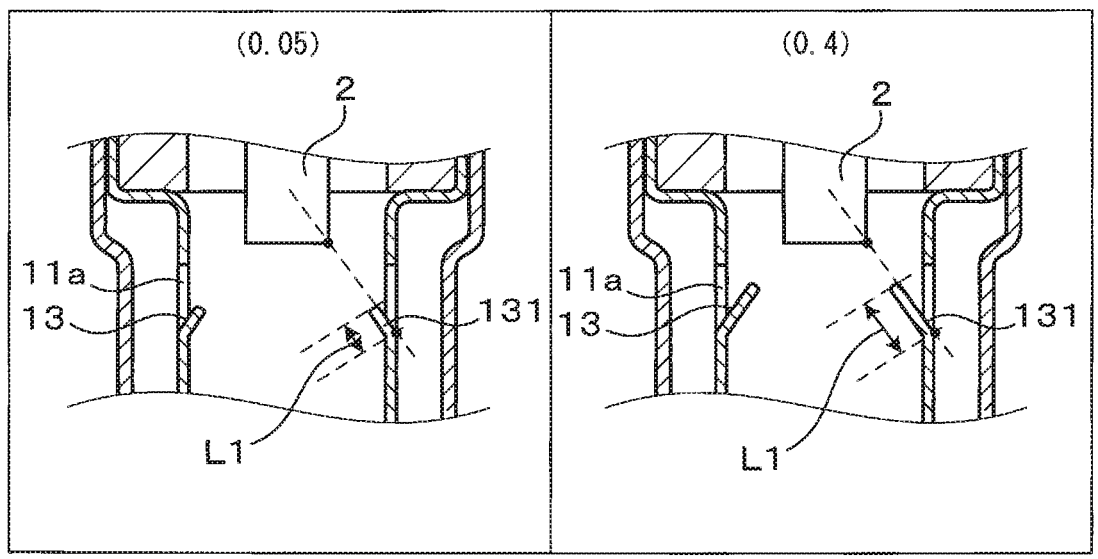
FIG. 20 shows enlarged cross-sectional views of PM sensors in which the ratio of the length of the extension direction line of a guide member to the distance of the detection surface is 0.05 and 0.4 respectively, from guide member evaluation tests.
Figure 21:
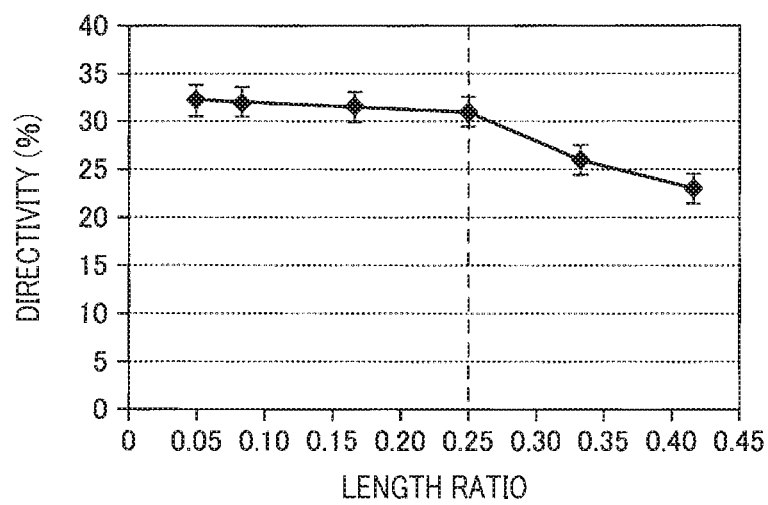
FIG. 21 is a diagram showing the relationship between directivity and the ratio of the length of the extension direction line of a guide member to the distance of the detection surface, from guide member evaluation tests.

As shown in FIG. 20, with a PM sensor S employing an element cover 1 having the configuration of the present embodiment, the length L1 from the base end to the extension end of the inclined surface 131 of a guide member 13 was varied, and the effect on the above-described directivity of changing the ratio L1/L2 of L1 to the distance L2 to the detection surface 20 was evaluated. FIG. 21 shows the results of investigation of the relationship between L1/L2 in the range of approximately 0.05 to 0.4 and the above-described directivity (units: ±%).

The left-side diagram in FIG. 20 shows the case in which a guide member 13 having a length ratio: L1/L2 of 0.05 was provided, whereby a gas inflow to the detection surface 20 of the sensor element 2 was recognized, but the directivity was ±32%, which is rather large. As shown in the right-side diagram of FIG. 20, when a guide member 13 having L1/L2 of 0.4 was provided, the gas flow into the detection surface 20 increased and the directivity decreased to approximately ±25%. Specifically, as shown in FIG. 21, when L1/L2 is in the range of 0.05 to 0.25, there is almost no change in the directivity, while when L1/L2 increases above 0.25, the directivity rapidly decreases. Hence if the length L1 of the inclined surface 131 of the guide member 13 is set such that L1/L2 is in a range exceeding 0.25, the directivity can be reduced.

<Evaluation of Clearance Ratio d1/d2>

Figure 22:
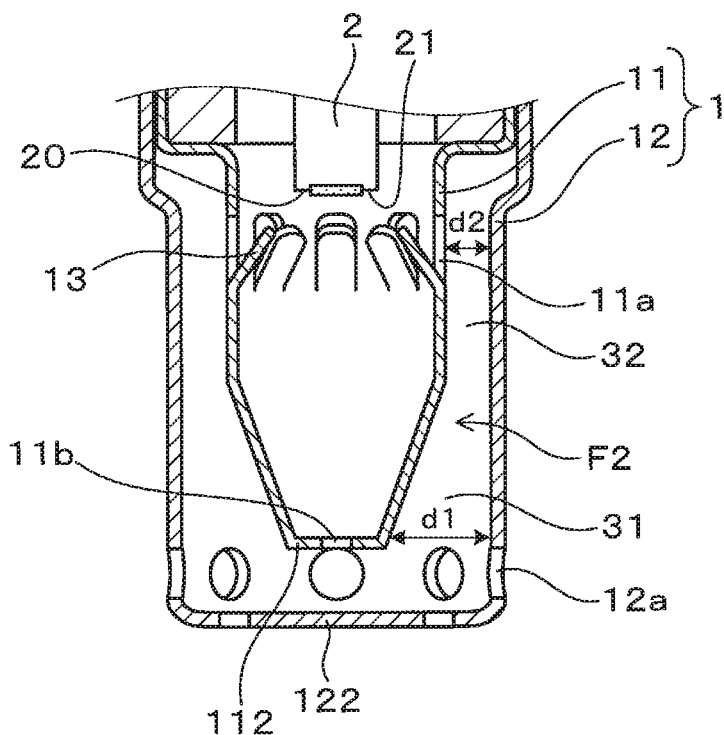
FIG. 22 is an enlarged cross-sectional view of a main part of a PM sensor according to the first embodiment, for describing a clearance ratio d1/d2 of an element cover, from guide member evaluation tests.

As shown in FIG. 22, designating the clearance amount in the large clearance portion 31 (that is, the maximum amount of clearance) as d1, and the clearance amount in the small clearance portion 32 (that is, the minimum amount of clearance) as d2, element covers 1 were prepared having values of the clearance ratio d1/d2 that varied in the range 1.5 to 20. The PM sensors S that were provided with these element covers 1 were respectively attached to a PM model gas bench, a model gas having a predetermined PM concentration was introduced, and the rise time of the output from the detection unit 21 of the sensor element 2 was evaluated. The test conditions were as follows, and the evaluation results are shown in FIG. 23.

Evaluation bench: PM model gas bench
Gas velocity: 10 m/s
PM concentration: 6 mg/m 3

Figure 23:
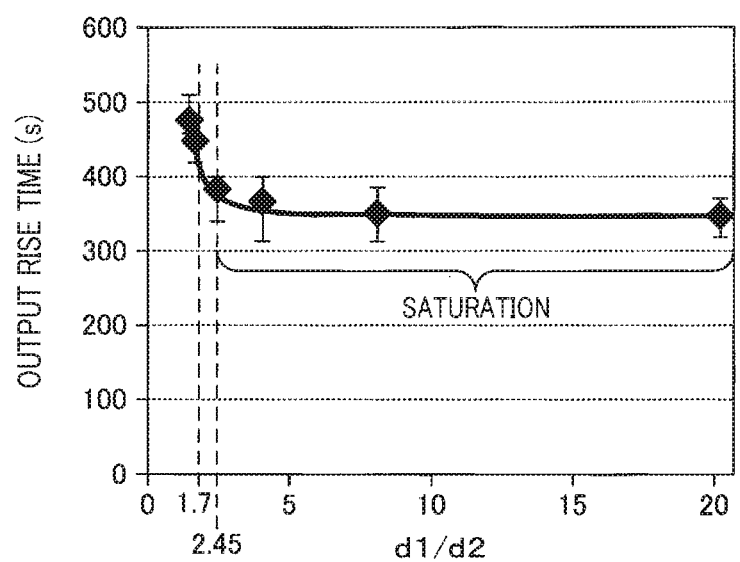
FIG. 23 is a diagram showing the relationship between the clearance ratio d1/d2 and output rise time, from guide member evaluation tests.

As shown in FIG. 23, when d1/d2 is varied in the range of 1.5 to 20, the rise time of the output sharply decreases as d1/d2 increases, and converges to a substantially constant value (that is, the range shown as "saturation" in the diagram) for values of d1/d2=2.45 or more. Specifically, with a configuration in which d1/d2=1.7, the rise time is reduced to approximately 450 seconds. Furthermore, with a configuration in which d1/d2=2.45, the rise time is less than 400 seconds, which is a reduction of approximately 100 seconds by comparison with a configuration in which d1/d2=1.5. At d1/d2=8, the rise time is reduced to about 350 seconds, and becomes almost constant.

Hence if an element cover 1 having a clearance ratio d1/d2 of 2.45 or more is utilized, the detection sensitivity can be greatly improved.

Figure 24:
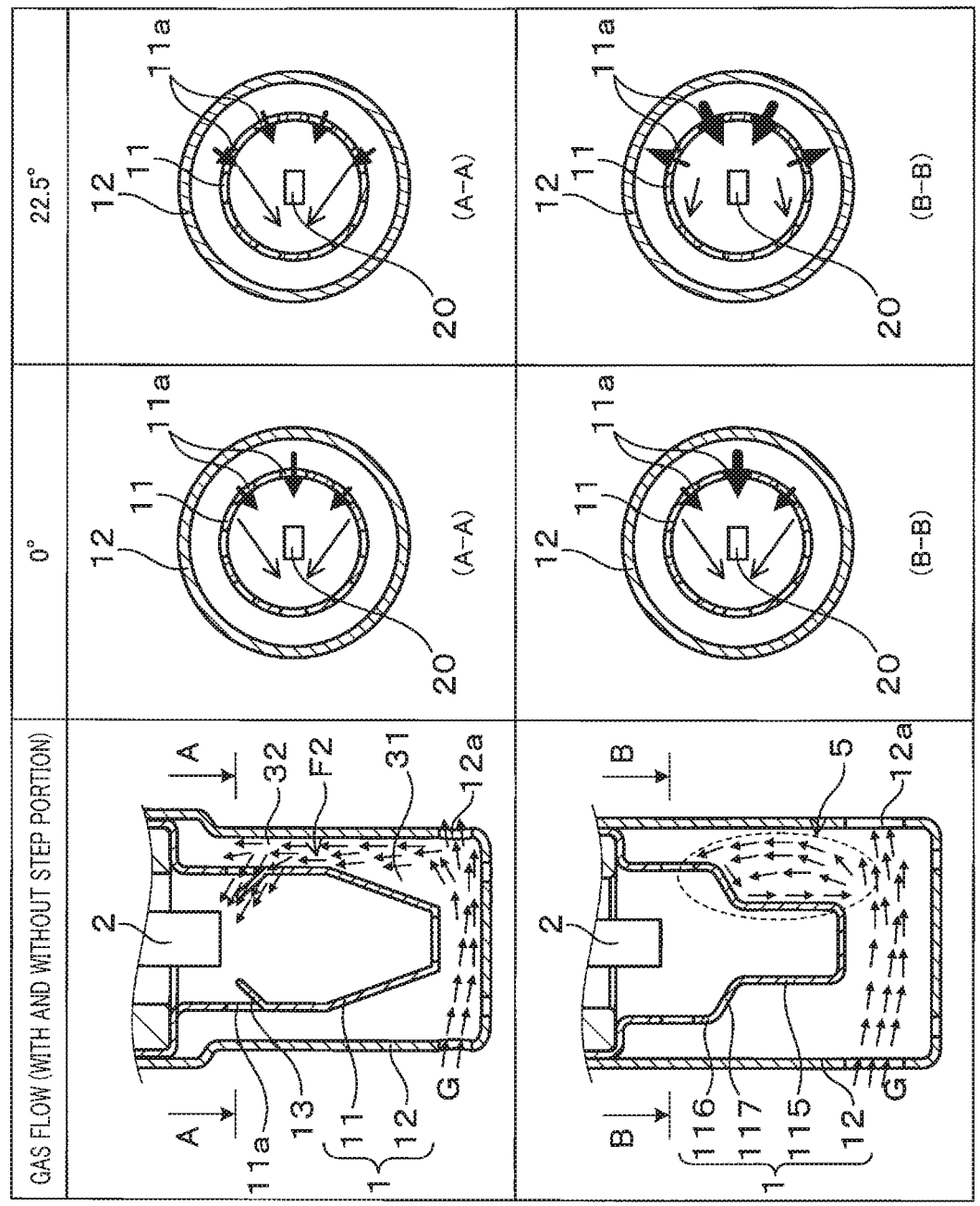
FIG. 24 shows enlarged cross-sectional views of a main part of a PM sensor according to the first embodiment and of a conventional PM sensor, in the axial direction and in the radial direction, schematically showing the results of CAE analysis of gas flow inside the element cover of the first embodiment and inside that of the conventional PM sensor.

As shown schematically in the upper part of FIG. 24, since with the configuration of the present embodiment the flow passage F2 is shaped such that the flow passage area becomes gradually smaller, the generation of eddy currents when the gas flow has a low flow velocity (for example, 10 m/s) is suppressed. That is, as shown in the upper left-side diagram, as the exhaust gas G that has flowed into the outer cover 12 passes in the opposite direction, a part of the gas flows smoothly into the large clearance portion 31 just before flowing out of the outer side holes 12a. This flow passes along the second flow passage F2, with the flow velocity increasing in the vicinity of the small clearance portion 32 at the base end, and then heads toward the sensor element 2, from an inner side hole 11a.

As a result, even if the rotation position of the inner cover 11 is changed (that is, to a mounting angle of 0° or 22.5°) as shown in the cross-sections taken through the line A-A, appearing in the upper central diagram and upper right-side diagram, there is only a small decrease in the gas flow velocity, and the turbulence component due to eddy currents is also small. Hence in either case, a gas flow is produced which passes toward the detection surface 20 of the sensor element 2, and the directivity with respect to the mounting angle is small. It should be noted that when the mounting angle is 0°, there is an inner side hole 11a which is located on the axis of the gas flow, at the downstream side, while when the mounting angle is 22.5° there is no inner side hole 11a located on that axis.

On the other hand, as shown for comparison in the lower part of FIG. 24, with a configuration which a step surface 117 having a tapered shape is formed between the tip-end half of the inner cover 11, which is formed as a small-diameter portion 115 having a fixed diameter, and the base-end half of the inner cover 11, which is formed as a large-diameter portion 116 having a fixed diameter, a large eddy current is readily formed. That is, as shown in the lower left-side diagram, just before flowing out of the outer side holes 12a, the exhaust gas G that has flowed into the outer cover 12 passes into the outer peripheral space 5 at the tip-end half portion 116, but is obstructed by the step surface 117, and thus an eddy current is formed, so that the flow velocity cannot readily increase.

As a result, the gas flow varies greatly in accordance with the rotation position of the inner cover 11, as shown in the cross-sections taken through B-B appearing in the lower central diagram and the lower right-side diagram. That is, when the mounting angle is 0°, the gas flow is relatively favorable, however, when the mounting angle is 22.5°, not only is the gas flow velocity reduced but in addition the gas flows in directions away from the detection surface 20 of the sensor element 2, due to the effects of turbulence. In addition, there is some leakage of gas through the inner side holes 11a to the outer cover 12 side. For that reason, whereas with the configuration of the present embodiment the gas supply rate at a mounting angle of 22.5° is approximately 0.8 times the gas supply rate at a mounting angle of 0°, in the case of the configuration having the step surface 117, the gas supply rate at a mounting angle of 22.5° is approximately 0.5 times the gas supply rate at a mounting angle of 0°, which is a substantial reduction.

Second Embodiment

Figure 25:
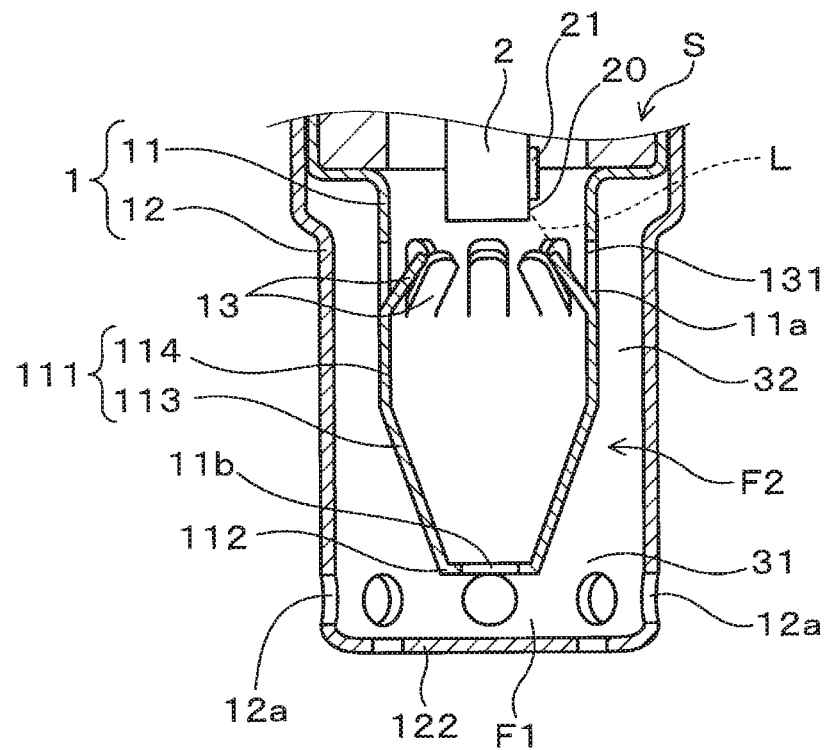
FIG. 25 is an enlarged cross-sectional view in the axial direction of a main part of a PM sensor according to a second embodiment.

A second embodiment of the PM sensor S as a sensor device will be described referring to FIGS. 25 and 26. In the first embodiment, the detection unit 21 is provided on the tip surface of the sensor element 2. However, as shown in FIG. 25, the detection unit 21 may be provided on a side of the sensor element 2. The configuration of the PM sensor S, other than that of the sensor element 2, is the same as for the first embodiment, and hence a description thereof will be omitted, with the following description focusing on the points of difference. It should be noted that those of the reference numerals used in the second and subsequent embodiments that are identical to reference numerals used in the above embodiment represent the same components, etc., as in the above embodiment, unless otherwise specified.

Figure 26:
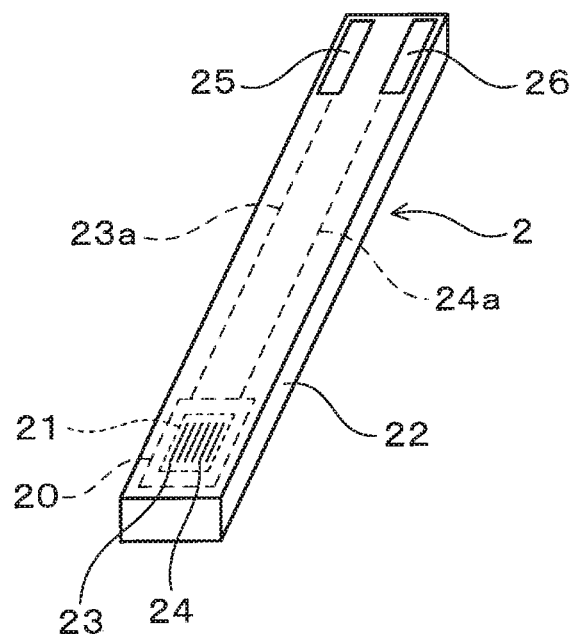
FIG. 26 is an overall perspective view of a sensor element of a PM sensor according to the second embodiment.

In FIG. 26, the sensor element 2 is a laminated element having a multi-layer structure, and has a detection unit 21 on a side surface of an insulating substrate 22 having a rectangular parallelepiped shape, on which electrodes 23 and 24 are exposed. The detection surface 20 is constituted by a side surface that is slightly larger than the outer periphery of the detection unit 21, and surrounds that outer periphery. The configuration whereby the electrodes 23 and 24 are connected to the terminal electrodes 25 and 26 via the lead portions 23a and 24a is the same as in the above embodiment.

As shown in FIG. 25, the sensor element 2 is disposed such that the side surface having the detection surface 20, provided with the detection unit 21, faces an inner side hole 11a through which the exhaust gas G flows into the inner cover 11.

A guide member 13 is disposed such that the extension line L of the inclined surface 131 thereof intersects the detection surface 20.

This promotes a flow of exhaust gas G into the inner cover 11, from the inner side hole 11a, which directly reaches the detection unit 21 located on the opposing detection surface 20, without diffusion of the flow. Hence even at a low flow velocity, a favorable detection performance can be maintained, without lowering of the detection sensitivity of the PM sensor S.

Third Embodiment

Figure 27:
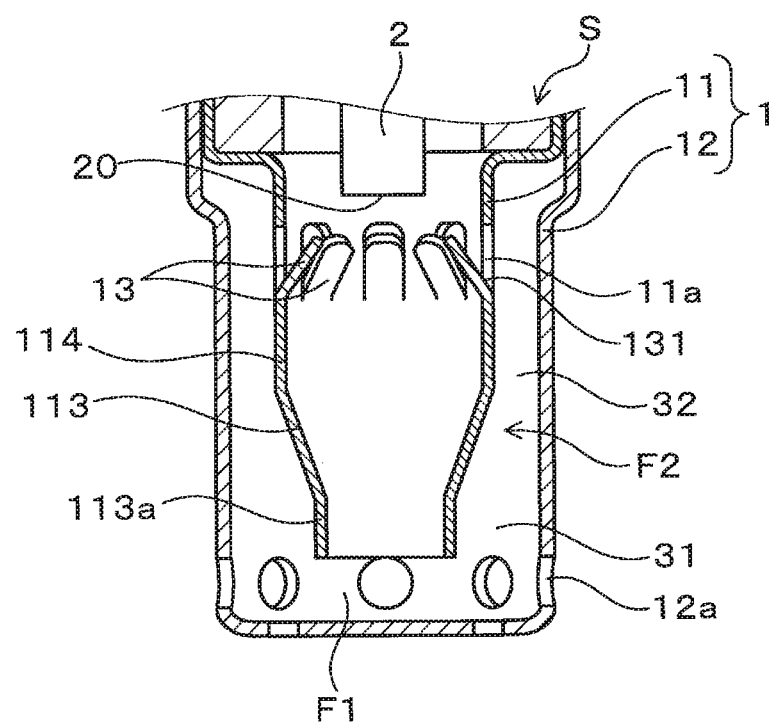
FIG. 27 is an enlarged cross-sectional view in the axial direction of a main part of a PM sensor according to a third embodiment

A third embodiment of the PM sensor S as a sensor device will be described referring to FIG. 27. It is not essential for the entirety of the first cylindrical portion 113 of the inner cover 11 to be tapered, and it may have a shape whereby the diameter gradually decreases from that of the large clearance portion 31, at the tip end, to that of the small clearance portion 32, at the base end. In the present embodiment, for example, a cylindrical portion 113a having a substantially constant diameter is provided as the tip-end portion of the inner cover 11, to form the large clearance portion 31. Other than for the cylindrical portion 113a, the first cylindrical portion 113 is formed in a tapered shape having a constant taper angle. In other respects the basic configuration of this embodiment is the same as that of the first embodiment, so that further description is omitted.

With such a configuration also, the flow velocity of the exhaust gas G that flows into the second flow passage F2 and heads toward the small clearance portion 32 is improved, and eddy currents are suppressed. Furthermore, since it is easy to set the clearance amount d1 of the large clearance portion 31, which is the maximum clearance, the second flow passage F2 can readily be formed with a prescribed clearance ratio d1/d2, so that the desired effects can be obtained.

Figure 28:
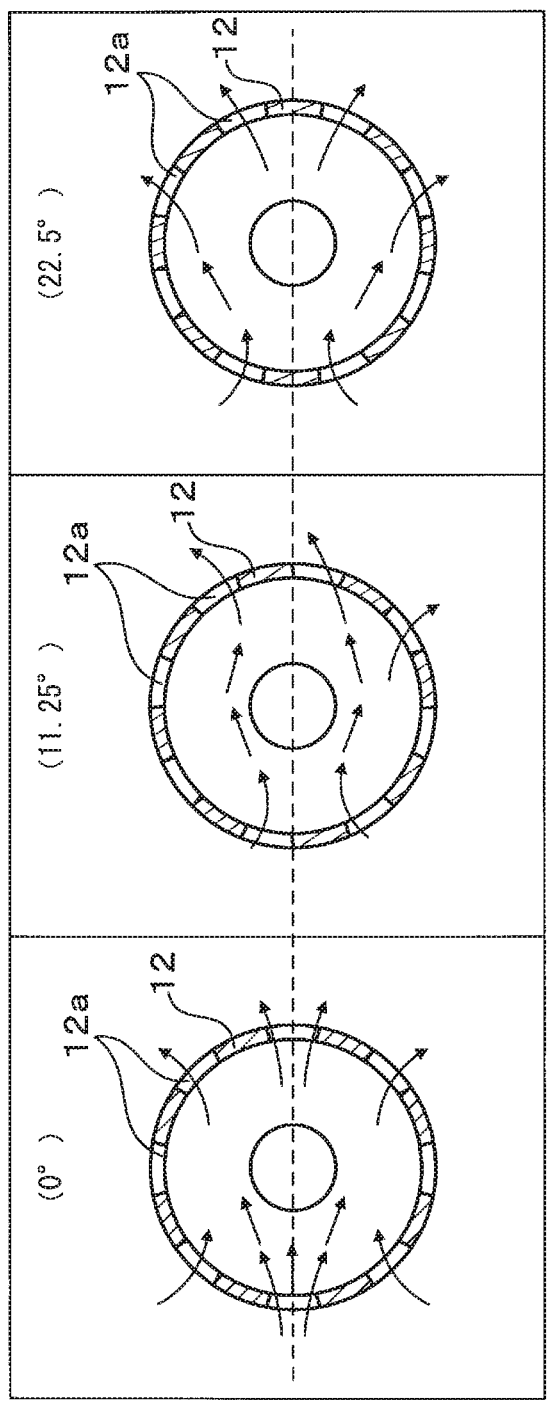
FIG. 28 shows enlarged cross-sectional views in the radial direction of the main part of the PM sensor according to the third embodiment.

As shown schematically by the gas flows in FIG. 28, which are based on the results of CAE analysis, the flow rate of the exhaust gas G within the outer cover 12 varies depending on the mounting angle of the element cover 1. The left-side diagram in FIG. 28 shows the case in which the mounting angle is 0° and there are outer side holes 12a which are positioned on a line (that is, the axis indicated by a dotted line in the drawing) which is parallel to the flow direction of the exhaust gas G and which passes through the center of the sensor element 2. The central diagram and the right-side diagram in FIG. 28 show the cases in which the mounting angle is 11.25° and 22.5° respectively, so that the outer side holes 12*a* are positioned slightly off-axis. In these case also, the exhaust gas G flows into the interior from outer side holes 12*a* that are close to the axis, however there is a region within the outer cover 12 where the flow velocity is decreased by comparison with the case in which the mounting angle is 0°. This disturbs the gas flow in the first flow passage F1, causing the flow to vary depending on the mounting angle. Hence it is desirable to dispose the outer side holes 12*a* such that the gas flow in the first flow passage F1 is uniform, irrespective of the mounting angle. An example of such an arrangement will be described in the following.

Fourth Embodiment

Figure 29:
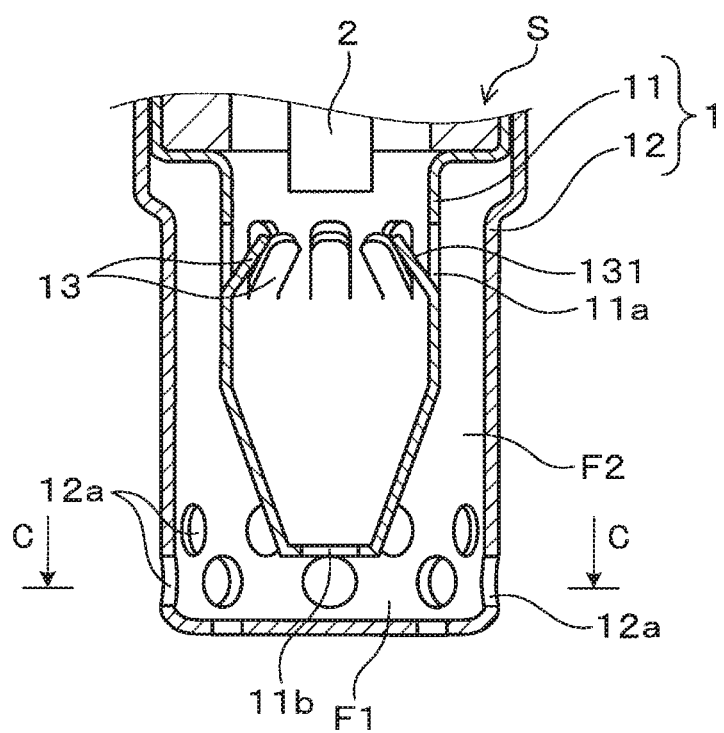
FIG. 29 is an enlarged cross-sectional view in the axial direction of a main part of a PM sensor according to a fourth embodiment.

A fourth embodiment of the PM sensor S as a sensor device will be described referring to FIGS. 29 to 31. As shown in FIG. 29, with this embodiment, the outer cover 12 has outer side holes 12 arranged in two rows with respect to the axial direction X, in the side 121 near the tip surface 122. In each row, the outer side holes 12*a* are disposed at eight locations that are equally spaced in a circumferential direction, with the outer side holes 12*a* belonging to the first row being formed at the tip side and the outer side holes 12*a* belonging to the second row being formed at the base side, and with the centers of the holes of the first row and of the second row being positioned alternately such that they do not overlap with respect to the axial direction X. All of the outer side holes 12*a* in the first row are located between the inner tip surface hole 11*b* and the tip surface 122 of the outer cover 12, and the base-end position of the outer side holes 12*a* in the first row is made close to, and substantially coincident with, the tip position of the inner tip surface hole 11*b*. The outer side holes 12*a* in the second row are arranged such as to surround the tip end portion of the inner cover 11, and such that the tip position of these outer side holes 12*a* substantially coincides with the tip position of the inner tip surface hole 11*b*.

By thus arranging the 16 outer side holes 12*a* in two or more rows in a staggered manner, the outer side holes 12*a* are configured to open uniformly around the entire circumference, thereby reducing the effect of the mounting angle. It should be noted that although with this embodiment the outer side holes 12*a* in the first row and the second row from the tip end are circular holes which each have the same diameter, it is not essential for these holes to have the same shape, and furthermore it is not necessary for the holes to be evenly distributed. That is, in the outer side holes 12*a* of the outer cover 12, the hole centers of outer side holes 12*a* that respectively belong to two adjacent rows do not need to be located on the same line, but may be displaced from one other, with respect to the axial direction. Furthermore, the number of rows of the outer side holes 12*a*, the number of the outer side holes 12*a* in each row, and the positional relationships with respect to the inner tip surface hole 11*b*, etc., may be changed as appropriate. For example, the tip position of the outer side holes 12*a* in the second row may be positioned closer to the tip end than the inner tip surface hole 11*b*, and the base position of the outer side holes 12*a* in the first row may be positioned closer to the base end than the inner tip surface hole 11*b*.

Figure 30:
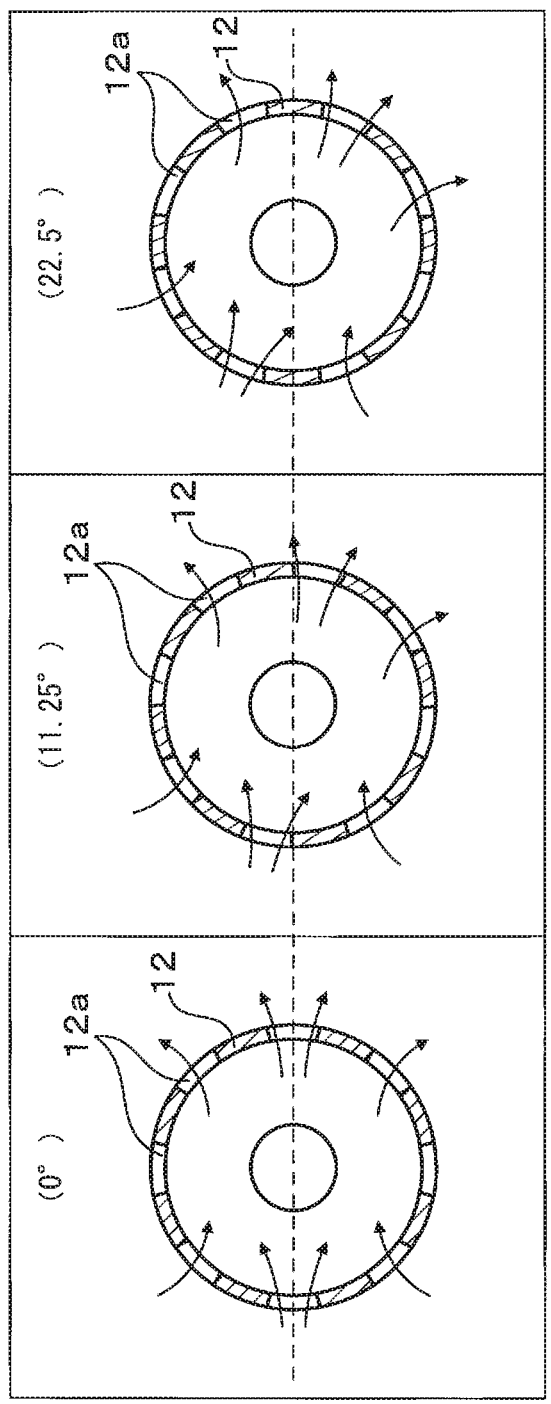
FIG. 30 shows enlarged cross-sectional views in the radial direction of the main part of the PM sensor according to the fourth embodiment.

As shown schematically in FIG. 30 based on results of CAE analysis, a satisfactory gas flow is formed irrespective of the mounting angle of the element cover 1. FIG. 30 shows cross-sections (through CC) taken at the position of the outer side holes 12*a* in the second row in FIG. 29. The left-side diagram in FIG. 30 shows the case in which the mounting angle is 0°, and in which there are outer side holes 12*a* that are positioned on the axis. The central diagram and the right-side diagram in FIG. 30 show cases in which the mounting angle is 11.25° and 22.5°, respectively, with the outer side holes 12*a* being positioned somewhat off-axis, and in which exhaust gas G can also be introduced from the outer side holes 12*a* of the first row, not indicated in the diagrams, without a substantial lowering of the gas flow rate.

Hence, since a sufficient flow of gas is formed by any of the outer side holes 12*a* located on the upstream side, with respect to the flow direction of the exhaust gas G, a stable Venturi effect can be obtained. In addition, a stable negative pressure is obtained in the vicinity of the inner end surface hole 11*b*. As a result, a flow of gas having a desired flow velocity is formed, the detection sensitivity is increased, and the mounting directivity is further reduced.

As described above, the inner cover 11 may be any shape, so long as the clearance amount of the second flow passage F2 is reduced gradually and no step surface 117 is formed. Furthermore, in the inner cover 11, the tapered surface that constitutes the first cylindrical portion 113 does not need to have a constant taper angle, and may, for example, have a shape in which a plurality of tapered surfaces with different taper angles are connected along the axial direction X. In this case too, by forming the entire first cylindrical portion 113 with substantially tapered shapes which are smoothly connected and which decrease in diameter from the base end to the tip end, the same effects may be obtained.

In that way the shape of the inner cover 11 or of the outer cover 12, which form the second flow passage F2, can be changed appropriately within a range whereby the improvement of the flow velocity of the exhaust gas G is obtained and the gas flow is not significantly affected.

Figure 31:
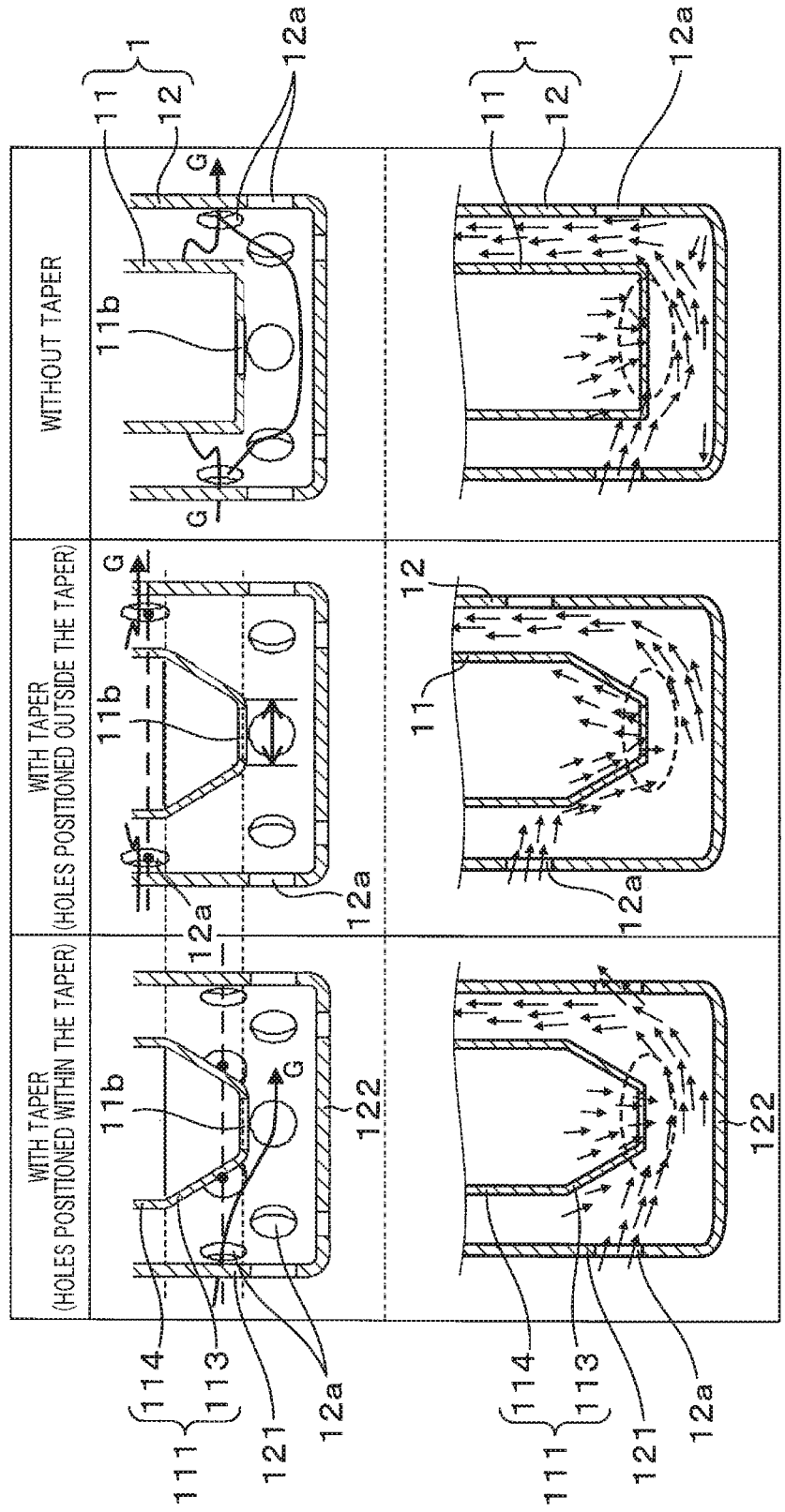
FIG. 31 shows enlarged cross-sectional views of a main part of a PM sensor according to the fourth embodiment, schematically showing the results of CAE analysis of gas flow inside the element cover according to the fourth embodiment and inside that of a modified example of the fourth embodiment, for comparison.

As shown in FIG. 31, when the outer side holes 12*a* are arranged in the side 121 of the outer cover 12 as two rows, with respect to the axial direction X, the inner cover 11 is preferably configured to have a tapered surface, while also the outer side holes 12*a* in the second row, at the base end side, are preferably formed at positions facing the tapered surface (see the left-side diagram in FIG. 31). The mechanism of the operational effect of this configuration will be described in the following, comparing the case in which the outer side holes 12*a* do not face the tapered surface (see the center diagram of FIG. 31) with the case in which there is no tapered surface (see the right-side diagram of FIG. 31).

In the outer cover 12 shown in the left-side diagram of FIG. 31, the inner tip surface hole 11*b* of the inner cover 11 is enclosed between the first row and second row of the outer side holes 12*a*, with the holes of respective rows being close to one other in the axial direction and being staggered in position with respect to a circumferential direction. In this case, since the outer side holes 12*a* in the second row face the first cylindrical portion 113 at the tip end of the inner cover 11, the exhaust gas G that flows in from the outer side holes 12*a* passes along the tapered surface. constituted by the first cylindrical portion 113, and is directed toward the tip end. As a result of this flow passing into the first flow passage F1, the gas flow velocity in the first flow passage F1 becomes increased, thereby producing a negative pressure in the vicinity of the inner tip surface hole 11*b*, and since the flow velocity is increased by the suction effect of the negative pressure, a satisfactory flow of gas toward the second flow passage F2 can be obtained.

On the other hand, the central diagram of FIG. 31 shows a case in which the outer side holes 12a of the second row in the outer cover 12 face the second cylindrical portion 114, which is closer to the base end than is the first cylindrical portion 113. In that case, since part of the exhaust gas G flowing in from the outer side holes 12a becomes a flow that passes outside the second cylindrical portion 114, a flow that passes along the tapered surface and is directed toward the first flow passage F1 is not sufficiently promoted. In such a case it is not possible to obtain a sufficient effect of increasing the gas flow rate in the vicinity of the inner tip surface hole 11b, by forming the second row of outer side holes 12a. With the outer cover 12 shown in the right-side diagram of FIG. 31, the inner cover 11 has a constant diameter, and the two rows of outer side holes 12a are close to one other, with the inner tip surface hole 11b interposed between them. In this case too, together with a flow of gas from the outer side holes 12a which merges into the first flow passage F1, a flow is formed which passes outside the inner cover 11, and hence there is a decrease in the effect of increasing the gas flow rate in the vicinity of the inner tip surface hole 11b.

Hence in order to effectively form a gas flow with the plurality of rows of outer side holes 12a, the tip position of at least the second row of outer side holes 12a should be closer to the tip end than is the connection between the first cylindrical portion 113 and the second cylindrical portion 114. Preferably, the hole center position of the outer side holes 12a should be closer to the tip end than is the connecting portion between the first cylindrical portion 113 and the second cylindrical portion 114, to further improve the gas flow along the tapered surface of the first cylindrical portion 113.

Fifth Embodiment

Figure 32:
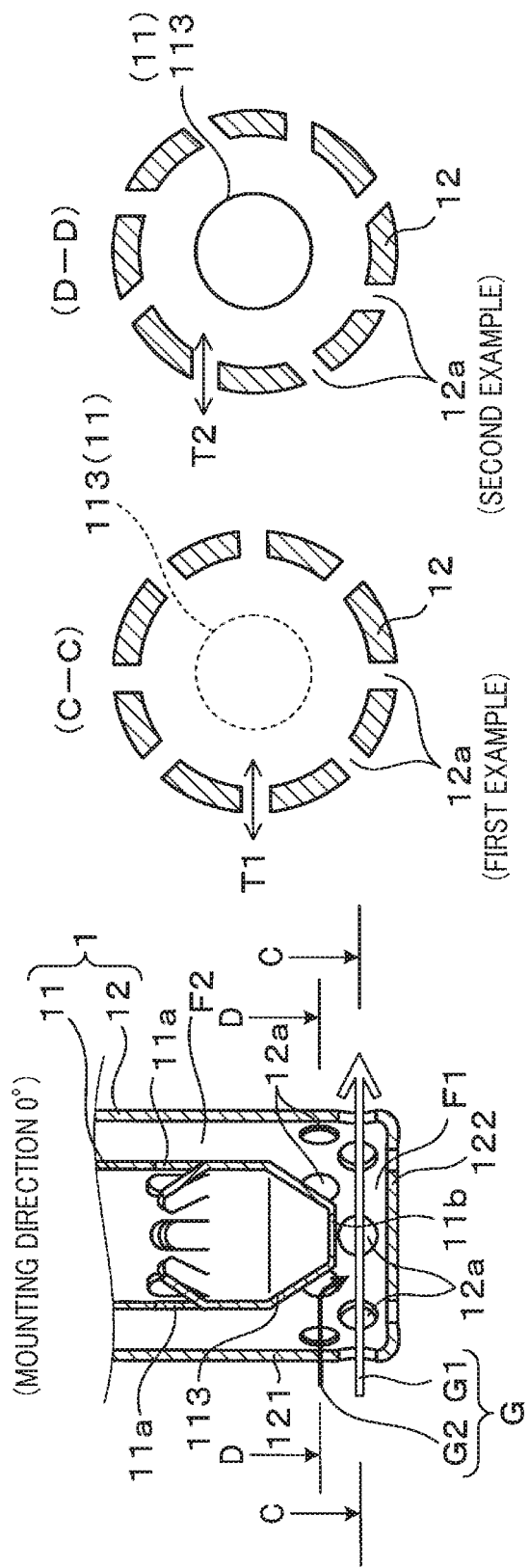
FIG. 32 shows enlarged cross-sectional views in the axial direction and in the radial direction of a main part of a PM sensor according to a fifth embodiment.

A fifth embodiment of the PM sensor S as a sensor device will be described referring to FIGS. 32 to 40. As shown in FIG. 32, with this embodiment also, the outer cover 12 has a plurality of outer side holes 12a in the side 121 near the tip surface 122, arranged in two rows with respect to the axial direction X, with the holes in each row disposed at eight locations that are equally spaced in a circumferential direction. It should be noted that it is not necessary for the outer side holes 12a of the first row (see the central diagram in FIG. 32) and the outer side holes 12a of the second row (see the right-side diagram of FIG. 32) to have the same shape, and the detection sensitivity and the mounting directivity can be further improved by changing the penetration directions of the through holes constituting the outer side holes 12a.

In this respect, as shown in the center diagram in FIG. 32, the outer side holes 12a in the first row are formed as through holes which penetrate the side 121 of the outer cover 12 in directions that are oriented toward the central axis. That is, the eight outer side holes 12a are uniformly arranged, with the penetration directions being eight directions that extend radially from the central axis. It should be noted that with the first to fourth embodiments described above, the inner side holes 11a in the inner cover 11 and the outer side holes 12a in the outer cover 12 are such radially-formed through holes (referred to hereinafter as radial holes, where appropriate).

On the other hand, in the case of the right-side diagram of FIG. 32, the outer side holes 12a in the second row are formed as through holes that penetrate the side 121 of the outer cover 12 in directions that are outside the central axis. Specifically, each of the outer side holes 12a of the second row is paired with a corresponding one of the outer side holes 12a of the first row, which is circumferentially adjacent thereto, with that outer side hole 12a of the second row being a hole (referred to in the following as a parallel hole, for convenience) that is formed with a penetration direction which is inclined with respect to a direction oriented toward the central axis, such that the penetration direction of that hole is made parallel to the penetration direction of its paired outer side hole 12a in the first row. An example of this is shown in the diagram, illustrating the positional relationship between the penetration direction (T1) of an outer side hole 12a that is in the first row and the penetration direction (T2) of its paired one of the outer side holes 12a of the second row.

In this case, as shown in the left-side diagram of FIG. 32, the exhaust gas G (hereinafter referred to as main flow G1), that flows in from the outer side holes 12a in the first row, heading toward the first flow passage F1, merges with a flow of gas (hereinafter referred to as the sub-flow G2) that passes in from the outer side holes 12a in the second row and flows to the first flow passage F1, so that, as described above, variations of the gas flow rate in accordance with the mounting angle at the time of mounting can be suppressed. However, it has been found that eddy currents, which have been generated due to the gas flow velocity and the mounting angle, strongly affect the detection sensitivity, and produce differences in the effect of improvement of the mounting directivity. The effects of the shape of the outer side holes 12a in the second row, in this respect, will be described hereinafter.

With the above embodiments, the effects on the gas flow of the arrangement of the guide member 13 in the element cover 1 and the shape of the second flow passage F2, etc., have mainly been evaluated for the example of a low flow velocity range of approximately 5 m/s or 10 m/s, however when the gas flow velocity is in a lower, ultra-low velocity range (for example, 3 m/s or less), the direction of the outer side holes 12a (hereinafter referred to as the mounting direction, for convenience), corresponding to the mounting angle at the time of mounting has a greater effect on the gas flow in the first flow passage F1.

Figure 33:
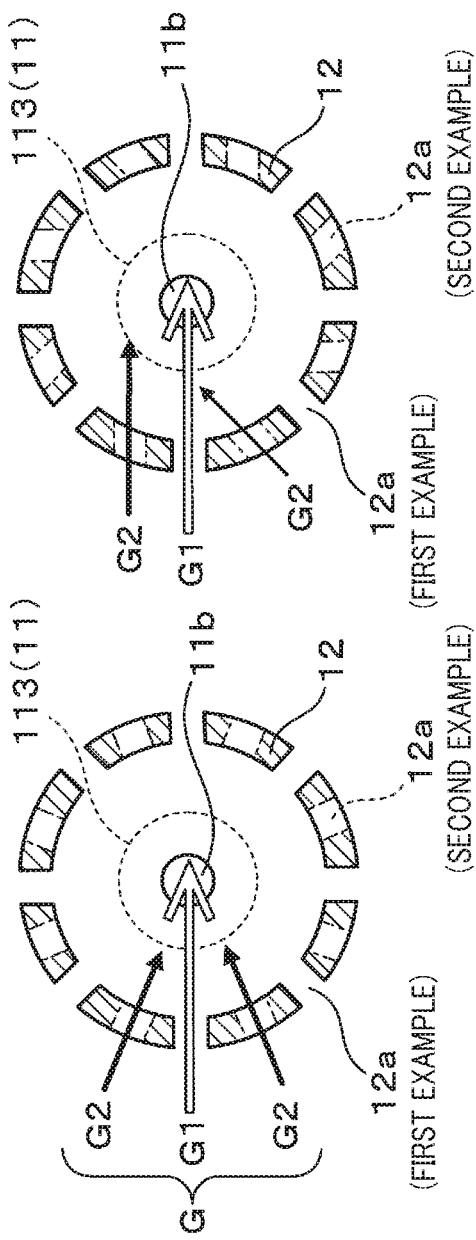
FIG. 33 shows enlarged cross-sectional views of the main part of a PM sensor, showing the mounting angle (mounting direction: 0°) of the PM sensor and the gas flow through the element cover, for comparing the PM sensor of the fifth embodiment with the configuration of the fourth embodiment.
Figure 34:
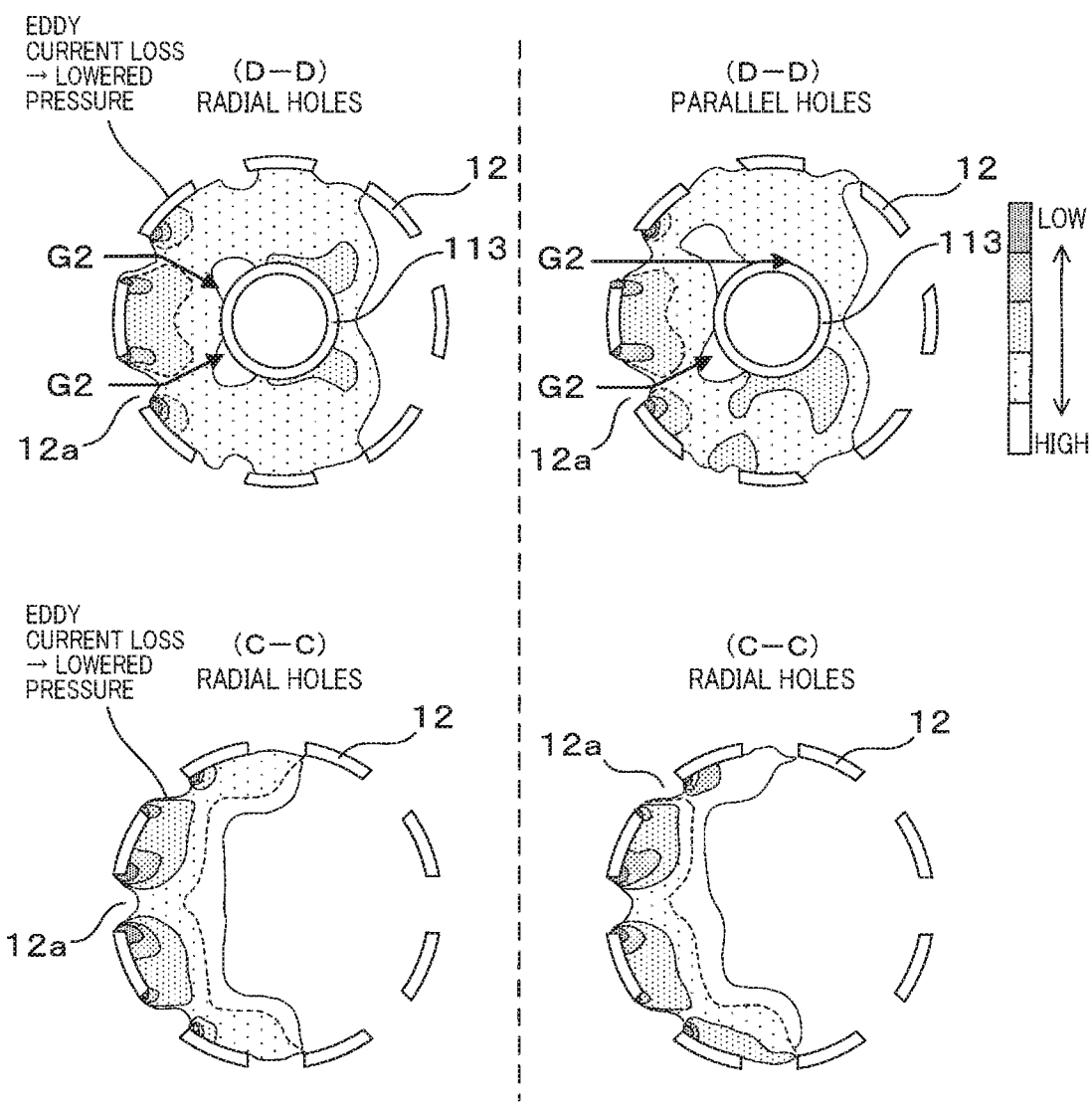
FIG. 34 shows enlarged cross-sectional views of the main part of a PM sensor, showing the mounting angle (mounting direction: 0°) of the PM sensor and the pressure distribution within the element cover, for comparing the PM sensor of the fifth embodiment with the configuration of the fourth embodiment.

For example, as schematically shown in FIGS. 33 and 34, when the mounting angle at the time of mounting is 0° (that is, the mounting direction is 0°), one of the first row of outer side holes 12a, from the tip end, is positioned in the flow direction of the main flow G1 of the exhaust gas G, and exhaust gas G that constitutes sub-flows G2 also flows in on both sides, from outer side holes 12a of the second row. In that case, as shown in the left-side diagram of FIG. 33, with a configuration in which both the first row and the second row of the outer side holes 12a are radial holes (for example, configured as for the fourth embodiment). The two sub-flows G2, which enter from holes in the second row of outer side holes, 12a and the main flow G1 that enters from the first row of outer side holes 12a, collide when they pass along the first cylindrical portion 113. The flow velocity of the main flow G1 is thereby decreased, and an eddy current can readily be generated on the upstream side of the inner cover 11. As shown in the upper diagram at the left side of FIG. 34, a pressure drop due to eddy current loss is observed close to the two outer side holes 12a from which the two sub-flows are formed, and as shown in the lower diagram at the left side of FIG. 34, a pressure drop due to eddy current loss also occurs in the vicinity of the first row of outer side holes 12a, on the upstream side of the inner tip surface hole 11b. As a result, a negative pressure cannot readily be generated in the vicinity of the inner tip surface hole 11b, and hence the detection sensitivity is reduced.

On the other hand, as shown in the right-side diagrams of FIG. 33, with a configuration in which the outer side holes 12a in the second row are parallel holes, one of the two sub-flows G2 that enter from outer side holes 12a in the second row becomes parallel to the main flow G1, which enters from an outer side hole 12a in the first row. Since that sub-flow G2 passes downstream of the inner cover 11 without colliding with the main flow G1, a decrease in the flow velocity of the main flow G1 is suppressed, and the generation of an eddy current on the upstream side of the inner cover 11 is prevented. Hence as shown in the upper diagram at the right side of FIG. 34, there is a reduction of the pressure drop in the vicinity of the outer side hole 12a where the sub-flow G2 that is parallel to the main flow G1 is formed, and accordingly, as shown in lower diagram at the right side of FIG. 34, the effect of the pressure drop on the main flow G1 is reduced. As a result, the generation of a negative pressure in the vicinity of the inner tip surface hole 11b is promoted, and the detection sensitivity is improved.

Figure 35:
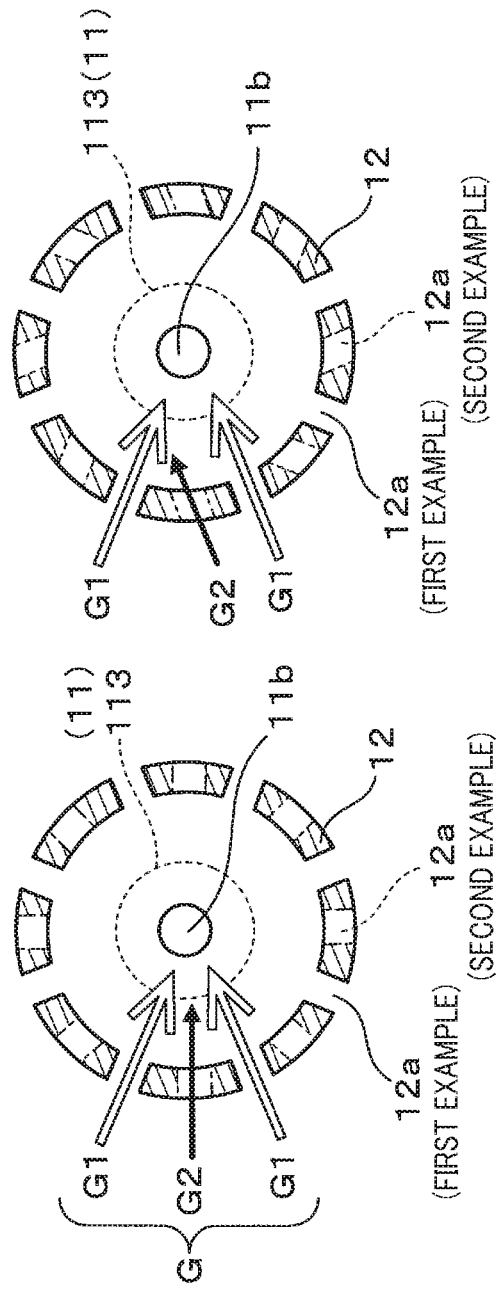
FIG. 35 shows enlarged cross-sectional views of the main part of a PM sensor, showing the mounting angle (mounting direction: 22.5°) of the PM sensor and the gas flow through the element cover, for comparing the PM sensor of the fifth embodiment with the configuration of the fourth embodiment.
Figure 36:
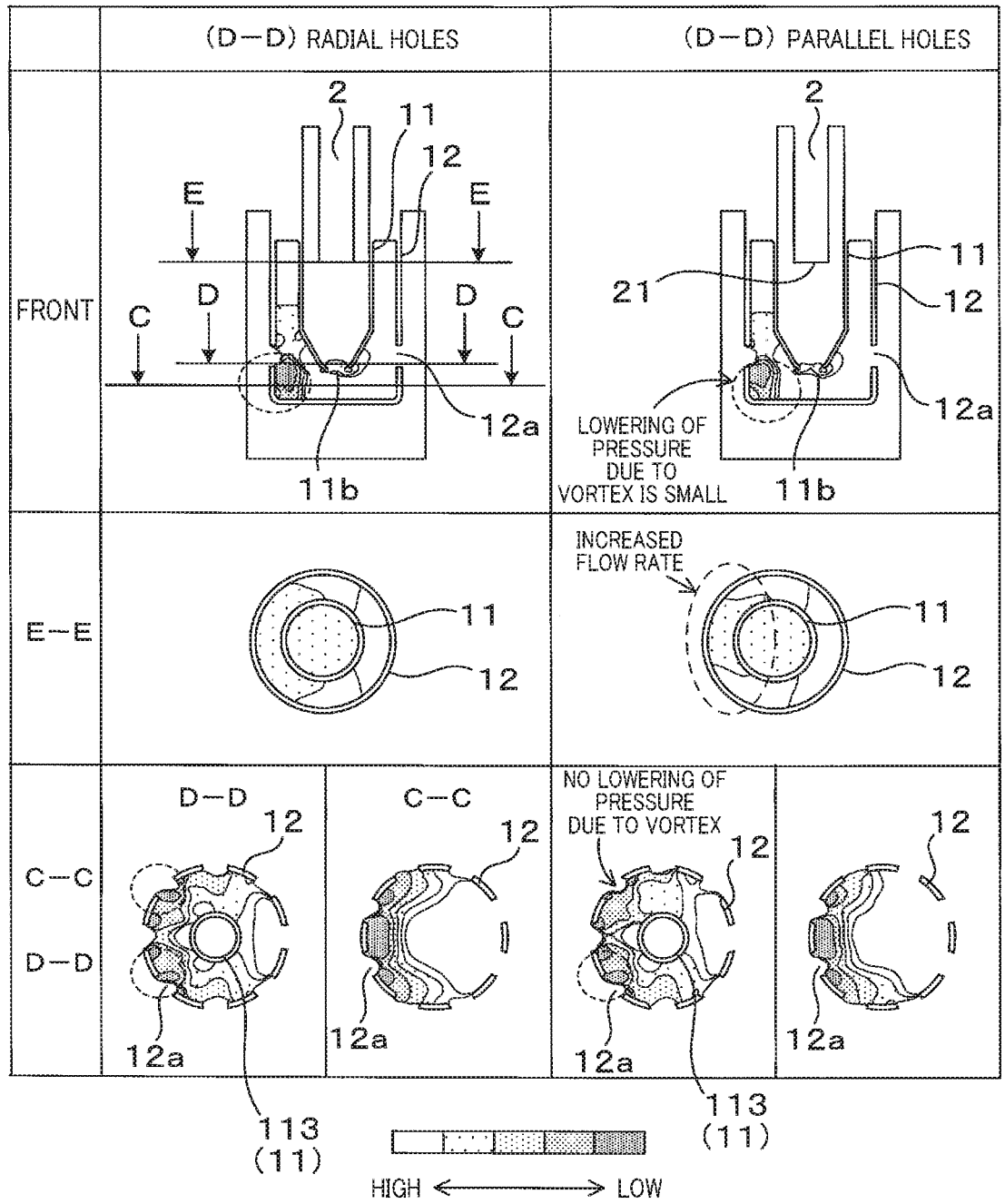
FIG. 36 shows enlarged cross-sectional views of the main part of a PM sensor, showing the mounting angle (mounting direction: 22.5°) of the PM sensor and the pressure distribution within the element cover, for comparing the PM sensor of the fifth embodiment with the configuration of the fourth embodiment.

On the other hand, as schematically shown in FIGS. 35 and 36, when the mounting angle at the time of mounting is 22.5° (that is, the mounting direction is 22.5°), one of the outer side holes 12a in the second row is located in the flow direction of the exhaust gas G constituting the main flow G1, and exhaust gas G constituting the main flow G1 flows in from the outer side holes 12a in the first row at two locations, positioned on each side of the aforementioned one of the outer side holes 12a in the second row. In this case also, as shown in the left-side diagram of FIG. 35, with a configuration in which the outer side holes 12a of both the first row and the second row of are radial holes (for example, the configuration of the fourth embodiment), collision occurs between a sub flow G2 that flows in from an outer side hole 12a in the second row and the main flow G1 flowing in from outer side holes 12a in the first row, when merging occurs. At this time, since a single sub-flow G2 merges between two main flows G1, the decrease in the flow velocity due to the collision is alleviated, however an eddy current is likely to be generated. For this reason, as shown in the upper and middle left-side diagrams of FIG. 36, a pressure drop due to eddy current loss is observed in the vicinity of the outer side holes 12a. As shown in the upper and lower left-side diagrams of FIG. 36, a pressure drop due to eddy current loss is observed near the outer side holes 12a at the upstream side.

On the other hand, as shown in the right-side diagram of FIG. 35, in the configuration in which the outer side holes 12a of the second row are parallel holes, a sub-flow G2 which flows in from an outer side hole 12a of the second row becomes parallel to one of the two main flows G1 which flow in from outer side holes 12a of the first row. As a result, a decrease in the flow velocity due to collision with the main flows G1 is prevented, and the generation of an eddy current is suppressed. Hence, as shown in the upper and lower right-side diagrams of FIG. 36, the pressure drop due to eddy current loss is reduced, or no pressure drop is observed in the vicinity of the outer side hole 12a where the sub-flow G2 which is parallel to a main flow G1 is formed. As a result, a negative pressure is stably generated in the vicinity of the inner tip surface hole 11b, and the detection sensitivity is improved.

It should be noted that, as indicated by the dotted-line outline in the central right-side diagram of FIG. 36, it has been confirmed based on CAE analysis that the gas flow velocity increases on the upstream side of the detection unit 21 of the sensor element 2, and it is presumed that the increase in gas flow velocity within the inner cover 11 is due to an increase in negative pressure.

As shown by the relationship between the flow rate reaching the detection unit 21 (that is to say, the arrival flow rate) and the mounting angle in the ultra-low flow velocity range of 3 m/s or less, indicated in the left-side diagrams of FIG. 37, there is a relative increase in the arrival flow rate when the flow velocity rises and the mounting angle is 0°. It is presumed that this is because the generation of negative pressure mainly contributes to the detection sensitivity in the ultra-low flow velocity range of 3 m/s or less, and it is observed that the lower the flow velocity in the ultra-low flow velocity range, in which the effect of eddy currents caused by collisions becomes large, the more readily will the detection sensitivity deteriorate. Hence at flow velocities of 1 m/s or 2 m/s, the arrival flow rate is higher when the mounting angle is 22.5° than when the mounting angle is 0°.

In this case too, collisions can be prevented, and the detection sensitivity improved, by configuring the outer side holes 12a in the second row to be parallel holes, as with the present embodiment. This effect of improving the detection sensitivity is observed at both of the mounting angles of 0° and 22.5°, such that when the mounting angle is 0°, the lower the flow velocity the greater becomes the improvement effect, while when the mounting angle is 22.5°, the higher the flow velocity the greater becomes the improvement effect. As a result, as shown in the right-side diagram of FIG. 37, the difference between the detection sensitivities at the mounting angles of 0° and 22.5° is reduced, and hence the mounting directivity is also improved.

In addition, as shown in the left-side diagram of FIG. 38, in a flow velocity range where the gas flow velocity is higher (for example, a low flow velocity range of greater than 3 m/s and less than 10 m/s), a sufficient negative pressure is generated, and hence the arrival flow rate when the mounting angle is 0° becomes relatively increased, while the arrival flow rate when the mounting angle is 22.5° becomes relatively decreased. For example, from CAE analysis results obtained for the high flow velocity range of 50 m/s, as shown schematically in the left-side diagrams of FIG. 39, with a configuration in which the outer side holes 12a of both the first row and the second row are radial holes, it is found that even when the mounting angle is 0° (that is, a mounting direction of 0°) the main flow G1 from the first row of outer side holes 12a has a sufficient flow rate, and when that main flow merges with the two sub-flows G2 from the second row of outer side holes 12a, the collision effect is small. For this reason, a sufficient negative pressure is generated in the vicinity of the inner tip surface hole 11b, and the inertia force of the gas flow from the first flow passage F1 toward the second flow passage F2 enables, for example, the gas flow from the three inner side holes 11a on the downstream side to reach the interior space of the cover 11 with a sufficient arrival flow rate.

On the other hand, when the mounting angle is 22.5° (that is, the mounting direction is) 22.5°, the flow directions of the two main flows G1 from the outer side holes 12a in the first row are different from one another, and since these collide with the sub flow G2 from an outer side hole 12a in the second row, an eddy current is likely to be generated. For that reason, it can be presumed that the detection sensitivity is worse than in the case where the mounting direction is 0°.

Figure 39:
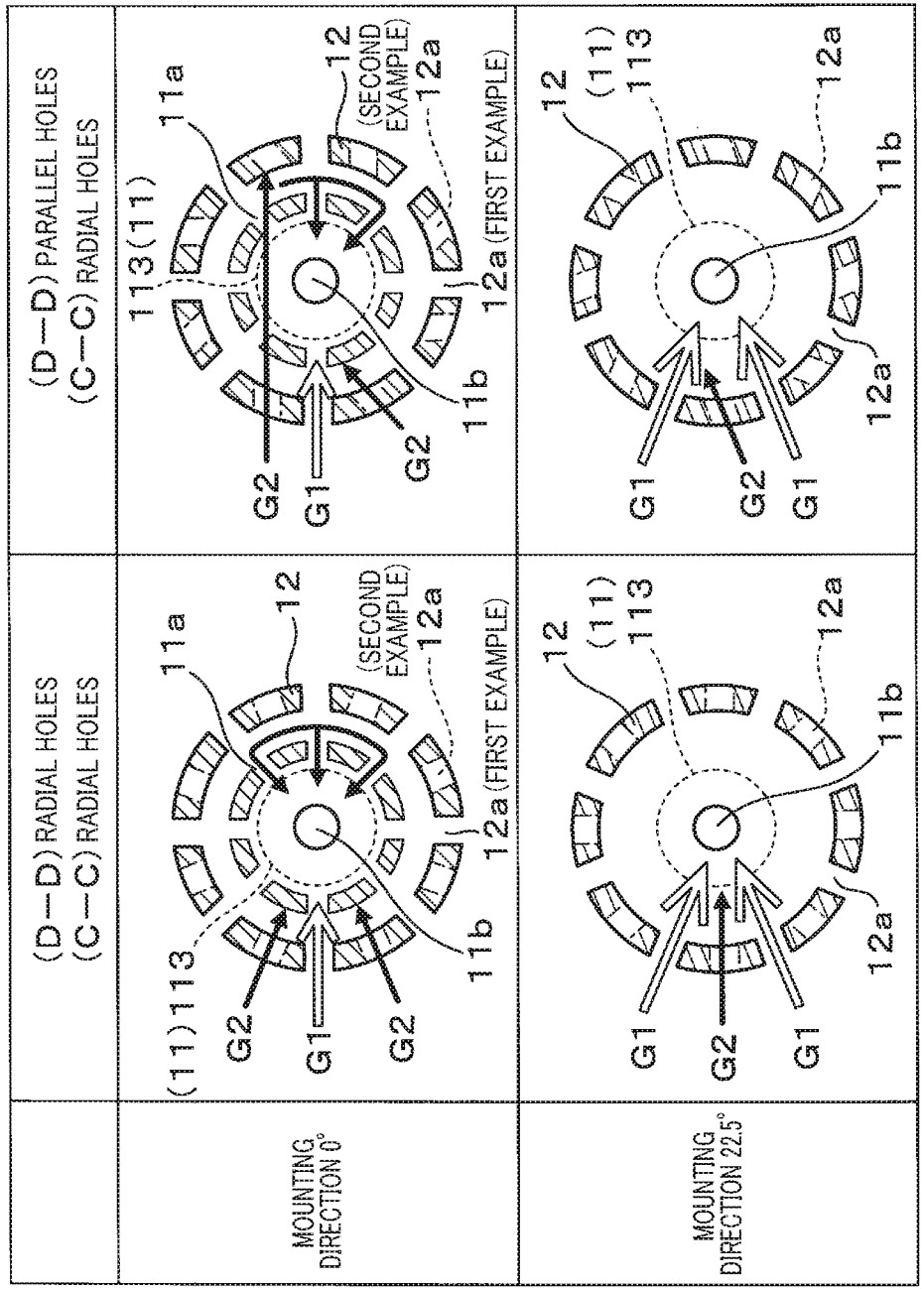
FIG. 39 shows enlarged cross-sectional views of the main part of a PM sensor, showing mounting angles (mounting directions: 0°, 22.5°) of the PM sensor and gas flow within the element cover, for comparing the PM sensor of the fifth embodiment with the configuration of the fourth embodiment.
Figure 40:
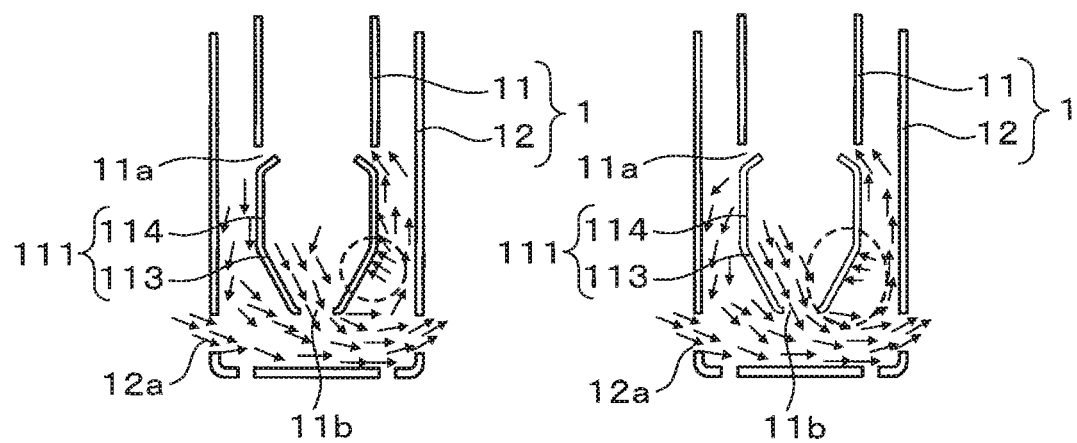
FIG. 40 shows enlarged cross-sectional views of the main part of a PM sensor, showing gas flow (high flow velocity range) within the element cover, for comparing the PM sensor of the fifth embodiment with the configuration of the fourth embodiment.

Also, in that case, as shown in the right-side diagrams of FIG. 39, by configuring the outer side holes 12a in the second row to be parallel holes as in the present embodiment, the effects of the collision with the sub-flow G2 can be reduced. In particular, when the mounting direction is 22.5°, the eddy current caused by the collision with the sub flow G2 is suppressed, and the two parallel flows merge near the inner tip surface hole 11b, thereby increasing the gas flow velocity in the vicinity of the inner tip surface hole 11b, and enabling the arrival flow rate to be increased.

When the mounting direction is 0°, although the collision of the sub-flow G2 with the main flows G1 is suppressed, the sub-flow G2 that flows parallel to a main flow G1 passes downstream of the inner cover 11 without being decelerated, and thus can readily collide with a part of the gas flow that is passing from the first flow passage F1 to the second flow passage F2. This, for example, weakens the inertia force of the gas flow which passes into the interior of the inner cover 11 from one of the inner side holes 11a on the downstream side, and hence the arrival flow rate is reduced. This is also shown in the CAE analysis results of FIG. 40, which indicate that with the configuration of the present embodiment shown in the right-side diagram of FIG. 40, in which the outer side holes 12a of the second row are parallel holes, the eddy current that is generated in the gas flow from the first flow passage F1 to the second flow passage F2 tends to be greater than with the configuration shown in the left-side diagram of FIG. 40, in which the outer side holes 12a of the first row and the second row are radial holes.

As a result, as shown in the right-side diagram of FIG. 39, the arrival flow rate is decreased when the mounting angle is 0°, but is increased when the mounting angle is 22.5°. That is, the mounting directivity is improved, due to a reduction of the difference in detection sensitivity. In that way, by adopting the configuration of the present embodiment, good mounting directivity can be obtained irrespective of the flow velocity of the exhaust gas G, from an ultra-low flow velocity range to a low flow velocity range, and also in a high flow velocity range.

In the above embodiments, a PM sensor S having a multi-layer type of sensor element 2 has been described as an example. However, it would be equally possible for the sensor element 2 to be a printed type of element, in which the electrodes 23 and 24 are formed by printing on a surface that constitutes the detection unit 21. In this case, the electrodes 23 and 24 would be formed by printing a comb shape on the surface of an insulating substrate 22 that is formed in a flat plate shape, and similarly, the electrodes 23 and 24 would be connected to the terminal electrodes 25 and 26 via lead portions 23a and 24a which would be formed by printing on the surface of the insulating substrate 22.

In the above embodiments, a sensor device consisting of a PM sensor S has been mainly described, however, the sensor device is not limited to being a PM sensor S, and it would be equally possible for the sensor device to be a gas sensor, which detects a specific gaseous component contained in the exhaust gas G. Specific examples are an exhaust gas sensor such as an oxygen sensor which detects oxygen in the exhaust gas G, an air-fuel ratio sensor which detects an air-fuel ratio, and a NOx sensor which detects NOx. The sensor element 2 used in these gas sensors can have a known configuration, for example, a configuration in which a detection unit 21 having a detection electrode is provided on the tip end of a cup type or laminated element.

In this case too, similarly to the above-described embodiments, the sensor element 2 could be inserted and retained within a housing H such that the detection unit 21 is at the tip end, with respect to the axial direction X, and the exterior of the detection unit 21 is protected by the element cover 1. Exhaust gas G introduced into the interior of the element cover 1 would then be guided from the second flow passage F1 to the second flow passage F2, then guided to the detection surface 20 via the guide member 13, thereby improving the output response of the detection unit 21 of the sensor element 2.

It would thereby be made possible to provide a gas sensor which exhibits a satisfactory detection performance even under operating conditions in which the exhaust gas G has a low flow rate. The exhaust gas purification performance could then be improved, by ascertaining the state of the internal combustion engine based on the detection result from the gas sensor, and controlling the exhaust gas purification system accordingly.

The present disclosure is not limited to the above embodiments, and may be applied to various embodiments without departing from the essence of the present disclosure. For example, in each of the embodiments described above, the case in which the sensor device is applied to an exhaust gas purification system for an automobile engine has been described, however the gas to be measured is not limited to being the exhaust gas from an internal combustion engine, and may be the exhaust gas from various types of apparatus. Furthermore, the gas to be measured is not limited to being an exhaust gas of internal combustion engine, and the present disclosure may be applied to a sensor device for detecting a specific component contained in various gases.

CONCLUSION

It is an objective of the present disclosure, for a configuration in which a sensor element is housed within an element cover having a double configuration, to increase the velocity at which a gas to be measured flows toward a detection section of the sensor element, for thereby improving the performance of the detection section in detecting a specific component, while also enabling water cracking to be prevented and so providing a sensor device having excellent reliability.

According to one aspect, the present disclosure provides a sensor device comprising:

a sensor element having a detection section for detecting a specific component in a gas under measurement, a housing having the sensor element inserted into the interior thereof, retained with the detection section positioned at the tip end of the sensor element with respect to the axial direction, and an element cover disposed at the tip end of the housing, with the element cover comprising an inner cover disposed such as to cover the tip end of the sensor element and an outer cover disposed with a space between the outer cover and the outer periphery of the inner cover;

wherein the inner cover has a side with an inner side hole provided therein and a tip surface with an inner tip surface hole provided therein, through which the gas under measurement flows, the outer cover has a side with a plurality of outer side holes provided therein, through which the gas under measurement flows, with the tip position of the outer side holes being disposed farther toward the tip end than is the tip end of the inner cover, while also a first flow passage is formed at the inner side of the tip end of the outer cover, through which the gas under measurement flows in a direction at right angles to the axial direction, and the inner side hole is open to a second flow passage, which is provided between the outer surface of the inner cover and the inner surface of the outer cover, a guide member is provided that slopes inward from the tip edge of the inner side hole toward the interior of the inner cover, and a detection surface, having the detection section disposed thereon, is positioned on an extension line of the extension direction of the guide member.

In a sensor device having the above configuration, the gas to be measured flows into the interior of the element cover from an outer side hole of the outer cover, passes via the first flow passage, which is disposed between the outer cover and the tip end of the inner cover, toward an outer side hole that is positioned facing the direction of flow, but with a part of that gas flow passing into the second flow passage, which is disposed between the sides of the outer cover and the inner cover. The gas flow that has reached the inner side hole, which is open to the second flow passage, becomes a jet flow along the guide member, and passes toward a detection surface that is on the extension line of the guide member, thereby preventing a decrease in the flow velocity. Since the inner side hole is open to the second flow passage, gas exchange is efficiently performed.

The gas to be measured can thereby be introduced from the inner side hole toward the detection section with an increased flow velocity, so that the supply flow rate to the detection section can be increased, and the detection sensitivity and output response can be improved. Furthermore, since no gas flow hole is required in the tip surface of the outer cover, the gas to be measured is prevented from flowing directly through an inner tip surface hole of the inner cover, thereby enabling water cracking of the sensor element to be suppressed.

As described above, according to the above aspect, with a configuration in which a sensor element is accommodated in an element cover having a double configuration, the flow velocity at which the gas to be measured passes toward the detection section of the sensor element is increased, enabling an improved performance by the detection section in detecting a specific component, while also enabling water cracking to be prevented, so that a sensor device having improved performance and also excellent reliability can be provided.

What is claimed is:

1. A sensor device comprising
a sensor element that includes a detection section for detecting a specific component in a gas to be measured,
a housing having the sensor element inserted into the interior thereof and retained such that the detection section is positioned at the tip end of the sensor element, with respect to an axial direction, and,
an element cover disposed at the tip end of the housing;
an element COver having an inner cover disposed such as to cover the tip end of the sensor element, and an outer cover, with a space between the outer cover and the exterior of the inner cover;
wherein
the inner cover has an inner side hole and an inner tip surface hole through which the gas to be measured flows, respectively provided in a side thereof and in a tip surface thereof;
a plurality of outer side holes, through which a gas to be measured flows, are provided in a side of the outer cover, arranged in the side of the outer cover as a plurality of rows with respect to the axial direction, with the outer side holes belonging to the first of the rows from the tip end being located closer to the tip end than is the inner tip surface hole, and with a first flow path having a gas flow direction that is at right angles to the axial direction being formed at the inner side of the tip surface of the outer cover;
the inner side hole is open to a second flow path that is provided between the outer surface of the inner cover and the inner surface of the outer cover, while also a guide member is provided which extends obliquely from a tip-position edge of the inner side hole toward the interior of the inner cover;
a detection surface having the detection section disposed thereon is located on an extension line that is in the extension direction of the guide member; and
the plurality of outer side holes are disposed such that the hole centers of the outer side holes belonging to two adjacent rows among the plurality of rows are not located on the same line, with respect to the axial direction.

2. The sensor device according to claim 1, wherein
the second flow path has a large clearance portion which has a maximum clearance amount at the outer periphery of the tip surface of the inner cover, and a small clearance portion which has a minimum clearance amount and is closer to the base end than is the large clearance portion, with the large clearance portion and the small clearance portion having flow paths which are shaped such as to be connected without a step.

3. The sensor device according to claim 2, wherein
designating the clearance amount of the large clearance portion, as measured in a direction at right angles to the axial direction, as d1, and designating the clearance amount of the small clearance portion, as measured in a direction at right angles to the axial direction, as d2, the clearance ratio d1/d2 is 2.45 or more.

4. The sensor device according to claim 1, wherein
designating the length of the inclined surface of the guide member with respect to the extension direction thereof as L1, and designating the length from the base end position of the inclined surface to the detection surface as L2, the length ratio L1/L2 is greater than 0.25.

5. The sensor device according to claim 1, wherein
the outer cover does not have a hole therein at a position facing the inner tip surface hole, with respect to the axial direction, and the plurality of outer side holes are disposed circumferentially in the side of the outer cover at equidistant intervals.

6. The sensor device according to claim 1, wherein
the plurality of outer side holes belonging to the first row from the tip end are through holes which respectively penetrate the side in directions that are oriented toward the central axis of the side, and the plurality of outer side holes belonging to the second row from the tip end are through holes which respectively penetrate the side in directions that are each parallel to the direction in which one of the outer side holes belonging to the first row penetrates the side.

7. The sensor device according to claim 1, wherein
the detection unit is provided on a tip surface of the sensor element or on a side surface at the tip end of the sensor element.

8. The sensor device according to claim 1, wherein
the gas to be measured is an exhaust gas from an internal combustion engine, and the specific component is a particulate matter or a specific gaseous component.

9. A sensor device comprising
a sensor element that includes a detection section for detecting a specific component in a gas to be measured,
a housing having the sensor element inserted into the interior thereof and retained such that the detection section is positioned at the tip end of the sensor element, with respect to an axial direction, and, an element cover disposed at the tip end of the housing;
the element cover having an inner cover disposed such as to cover the tip end of the sensor element, and an outer cover, with a space between the outer cover and the exterior of the inner cover;
wherein:
the inner cover has an inner side hole and an inner tip surface hole through which the gas to be measured flows, respectively provided in a side thereof and in a tip surface thereof;
a plurality of outer side holes, through which a gas to be measured flows, are provided in a side of the outer cover, arranged in the side of the outer cover as a plurality of rows with respect to the axial direction, with the outer side holes belonging to the first of the rows from the tip end being located closer to the tip end than is the inner tip surface hole, and with a first flow path having a gas flow direction that is at right angles to the axial direction being formed at the inner side of the tip surface of the outer cover;
the inner side hole is open to a second flow path that is provided between the outer surface of the inner cover and the inner surface of the outer cover, while also a guide member is provided which extends obliquely from a tip-position edge of the inner side hole toward the interior of the inner cover;
a detection surface having the detection section disposed thereon is located on an extension line that is in the extension direction of the guide member; and
the side of the inner cover has a first cylindrical portion which has a tapered shape and expands in diameter from the tip end to the base end thereof, and a second cylindrical portion, which has a constant diameter and extends continuously from the base end of the first cylindrical portion, and in that the tip end position of the outer side holes belonging to the second row from the tip end, with respect to the axial direction, is farther toward the tip end than is the position of connection between the first cylindrical portion and the second cylindrical portion.

10. The sensor device according to claim 9, wherein a plurality of the inner side holes are provided, disposed along a circumferential direction in the second cylindrical portion.

11. A sensor device comprising
a sensor element that includes a detection section for a detecting a specific component in a gas to be measured,
a housing having the sensor element inserted into the interior thereof and retained such that the detection section is positioned at the tip end of the sensor element, with respect to an axial direction, and,
an element cover disposed at the tip end of the housing;
the element cover having an inner cover disposed such as to cover the tip end of the sensor element, and an outer cover, with a space between the outer cover and the exterior of the inner cover;
wherein:
the inner cover has an inner side hole and an inner tip surface hole through which the gas to be measured flows, respectively provided in a side thereof and in a tip surface thereof;
a plurality of outer side holes, through which as gas to be measured flows, are provided in a side of the outer cover, arranged in the side of the outer cover as a plurality of rows with respect to the axial direction, with the outer side holes belonging to the first of the rows from the tip end being located closer to the tip end than is the inner tip surface hole, and with a first flow path having a gas flow direction that is at right angles to the axial direction being formed at the inner side of the tip surface of the outer cover;
the inner side hole is open to a second flow path that is provided between the outer surface of the inner cover and the inner surface of the outer cover, while also a guide member is provided which extends obliquely from a tip-position edge of the inner side hole toward the interior of the inner cover;
a detection surface having the detection section disposed thereon is located on an extension line that is in the extension direction of the guide member; and
the side of the inner cover has a first cylindrical portion which has a tapered shape and expands in diameter from the tip end to the base end thereof, and a second cylindrical portion, which has a constant diameter and extends continuously from the base end of the first cylindrical portion.

* * * * *